United States Patent
Chun

(10) Patent No.: US 11,864,147 B2
(45) Date of Patent: Jan. 2, 2024

(54) METHOD AND DEVICE FOR PERFORMING REGISTRATION IN NETWORK IN WIRELESS COMMUNICATION SYSTEM

(71) Applicant: LG ELECTRONICS INC., Seoul (KR)

(72) Inventor: Sungduck Chun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 216 days.

(21) Appl. No.: 17/420,905

(22) PCT Filed: Jan. 6, 2020

(86) PCT No.: PCT/KR2020/000216
§ 371 (c)(1),
(2) Date: Jul. 6, 2021

(87) PCT Pub. No.: WO2020/141965
PCT Pub. Date: Jul. 9, 2020

(65) Prior Publication Data
US 2022/0070814 A1    Mar. 3, 2022

(30) Foreign Application Priority Data

Jan. 4, 2019  (KR) .................. 10-2019-0001399
Apr. 26, 2019  (KR) .................. 10-2019-0049042

(51) Int. Cl.
*H04W 60/04*   (2009.01)
*H04W 4/90*    (2018.01)
(Continued)

(52) U.S. Cl.
CPC ............ *H04W 60/04* (2013.01); *H04W 4/90* (2018.02); *H04W 8/02* (2013.01); *H04W 48/18* (2013.01); *H04W 88/06* (2013.01); *H04W 84/042* (2013.01)

(58) Field of Classification Search
CPC ....... H04W 12/06; H04W 4/90; H04W 48/12; H04W 48/18; H04W 60/04; H04W 8/02; H04W 84/042; H04W 88/06
See application file for complete search history.

(56) References Cited

U.S. PATENT DOCUMENTS 9,648,480 B2 *   5/2017   Sammour .............. H04W 68/02
2004/0081139 A1 *  4/2004   Beckmann .............. H04W 4/90
                                                   455/560

(Continued)

FOREIGN PATENT DOCUMENTS

AU    2009223307 B2 *  12/2012  ......... H04L 12/1895
CA       2948921 C   *  4/2019  .......... H04W 36/005

(Continued)

OTHER PUBLICATIONS

PCT International Search Report and Written Opinion in International Appln. No. PCT/KR2020/000216, dated Apr. 28, 2020, 5 pages.

(Continued)

*Primary Examiner* — Matthew C Sams
(74) *Attorney, Agent, or Firm* — Fish & Richardson P.C.

(57) ABSTRACT

A method for performing, by a user equipment (UE), a registration to a network in a wireless communication system is disclosed. Specifically, the UE performs a registration to a first public land mobile network (PLMN) via a first base station, receives an disaster related message applied to the first PLMN or applied to an area in which the UE is located when there is no service provided from the first PLMN, transmits a registration request message to a second PLMN providing an disaster roaming service based on the disaster related message, and receives, from the second PLMN, a response message to the registration request message. The UE is subscribed to the first PLMN, and the second PLMN is configured to provide the disaster roaming service to the (Continued)

UE based on a disaster applied to the first PLMN or applied to the area in which the UE is located.

5 Claims, 14 Drawing Sheets

(51) Int. Cl.
*H04W 8/02* (2009.01)
*H04W 48/18* (2009.01)
*H04W 88/06* (2009.01)
*H04W 84/04* (2009.01)

(56) References Cited

U.S. PATENT DOCUMENTS

| | | | | |
|---|---|---|---|---|
| 2010/0075625 | A1* | 3/2010 | Wu | H04W 76/40 455/404.1 |
| 2012/0100848 | A1* | 4/2012 | Miklos | H04W 16/08 455/432.1 |
| 2014/0134970 | A1* | 5/2014 | Pazos | H04W 4/90 455/404.1 |
| 2015/0017982 | A1* | 1/2015 | Klatt | H04W 68/00 455/434 |
| 2017/0006536 | A1* | 1/2017 | Baek | H04W 12/06 |
| 2017/0086047 | A1 | 3/2017 | Buckley et al. | |
| 2017/0223584 | A1* | 8/2017 | Deng | H04W 72/0446 |
| 2019/0253842 | A1* | 8/2019 | Rao | H04W 4/029 |
| 2020/0084741 | A1* | 3/2020 | Chun | H04W 12/08 |
| 2022/0070815 | A1* | 3/2022 | Chun | H04W 4/90 |

FOREIGN PATENT DOCUMENTS

| | | | |
|---|---|---|---|
| EP | 2445244 | 4/2012 | |
| EP | 2445244 A1 * | 4/2012 | ............ H04W 16/08 |
| EP | 2493248 | 8/2012 | |
| EP | 3113547 | 1/2017 | |
| KR | 10-2011-0049720 | 5/2011 | |
| KR | 10-2011-0067270 | 6/2011 | |
| KR | 10-2011-0091305 | 8/2011 | |
| KR | 10-2017-0004764 | 1/2017 | |
| WO | 2016/160112 | 10/2016 | |
| WO | WO-2019122494 A1 * | 6/2019 | |

OTHER PUBLICATIONS

Extended European Search Report in European Appln. No. 20735857.3, dated Jan. 24, 2022, 11 pages.

* cited by examiner

[FIG. 1]
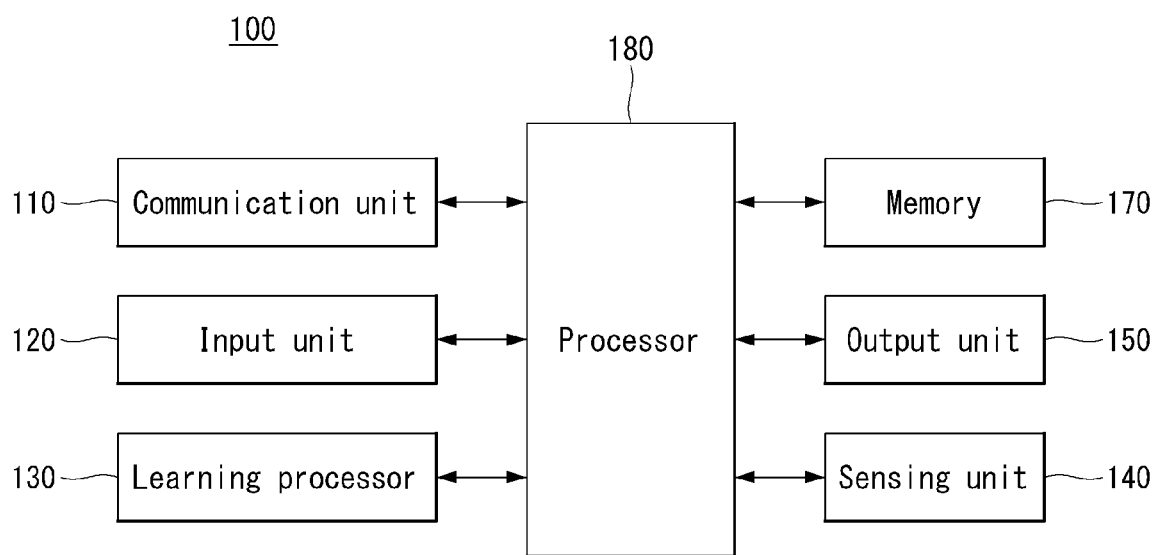
[FIG. 2]
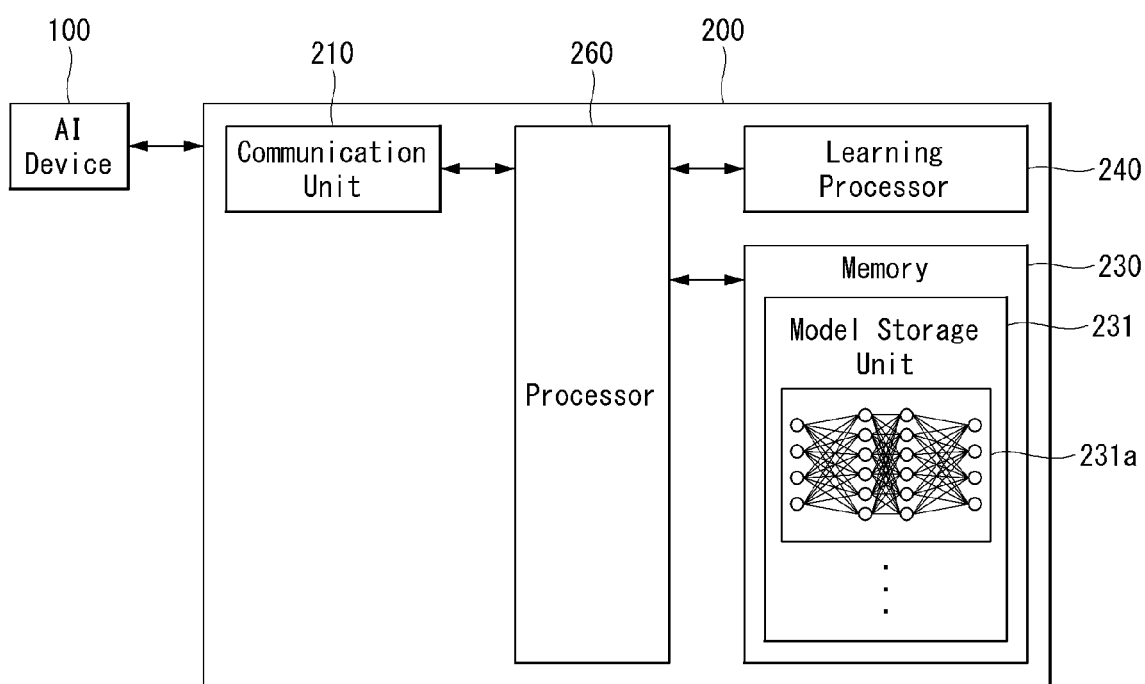

[FIG. 3]
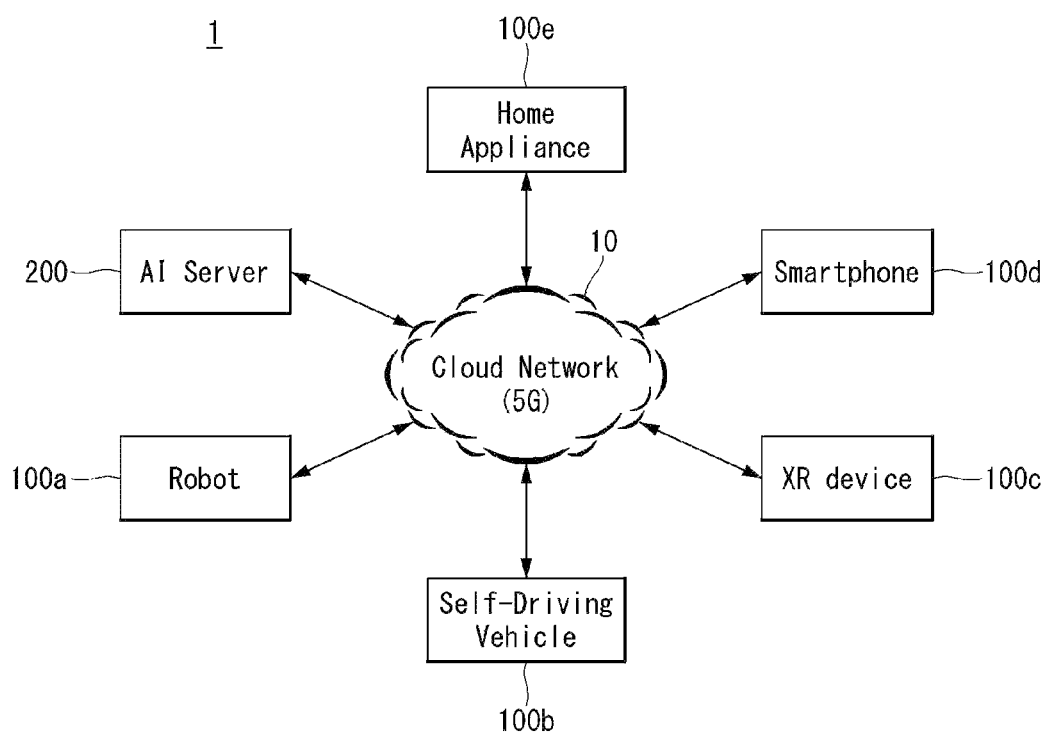

[FIG. 4]
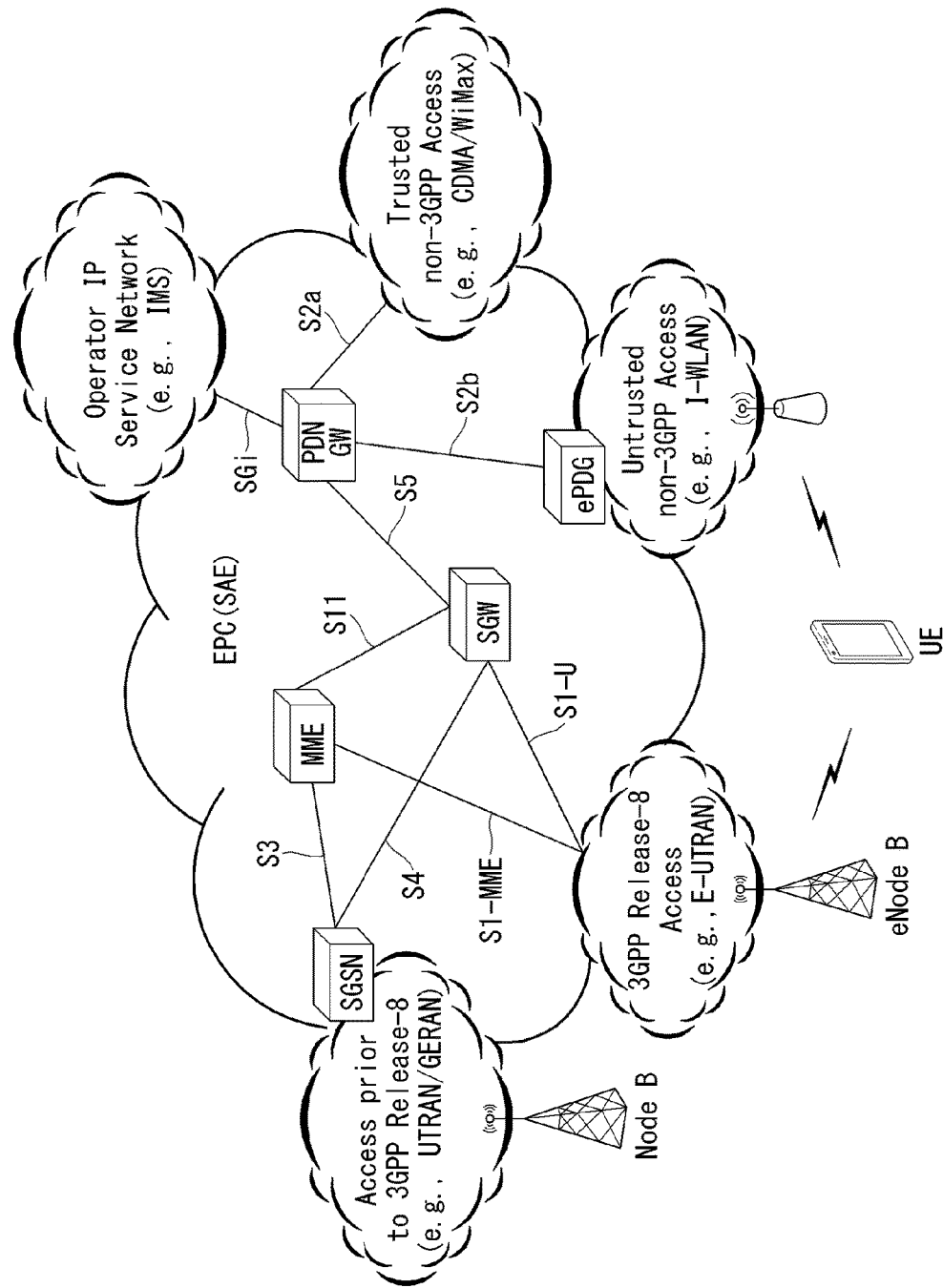

[FIG. 5]
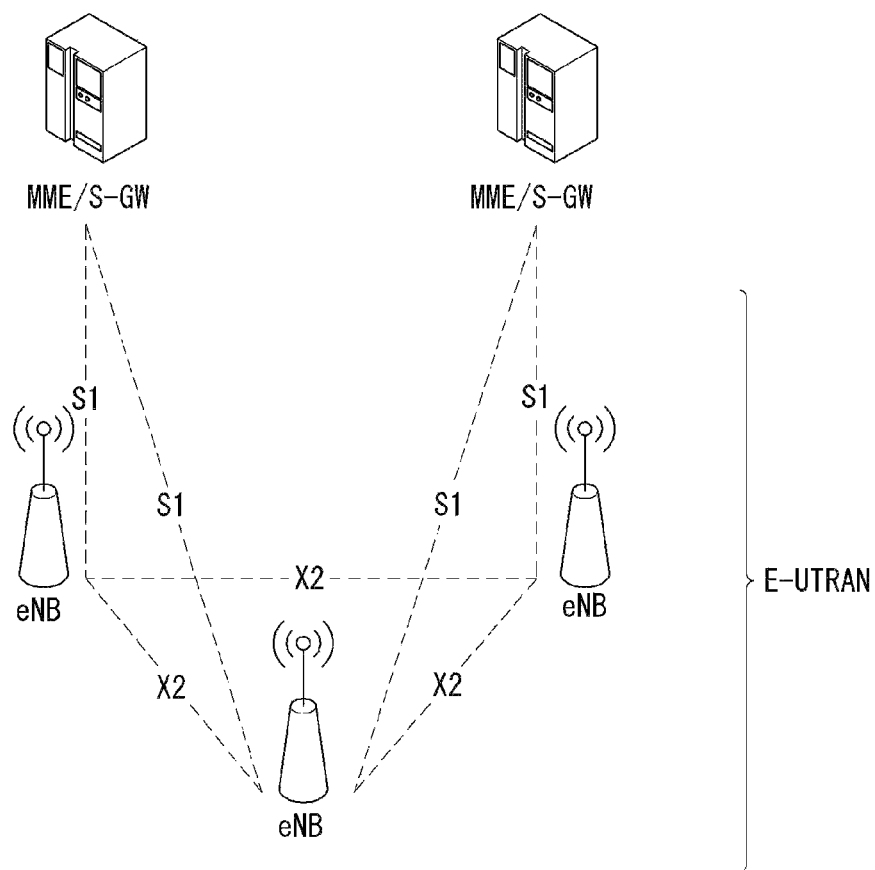

[FIG. 6]
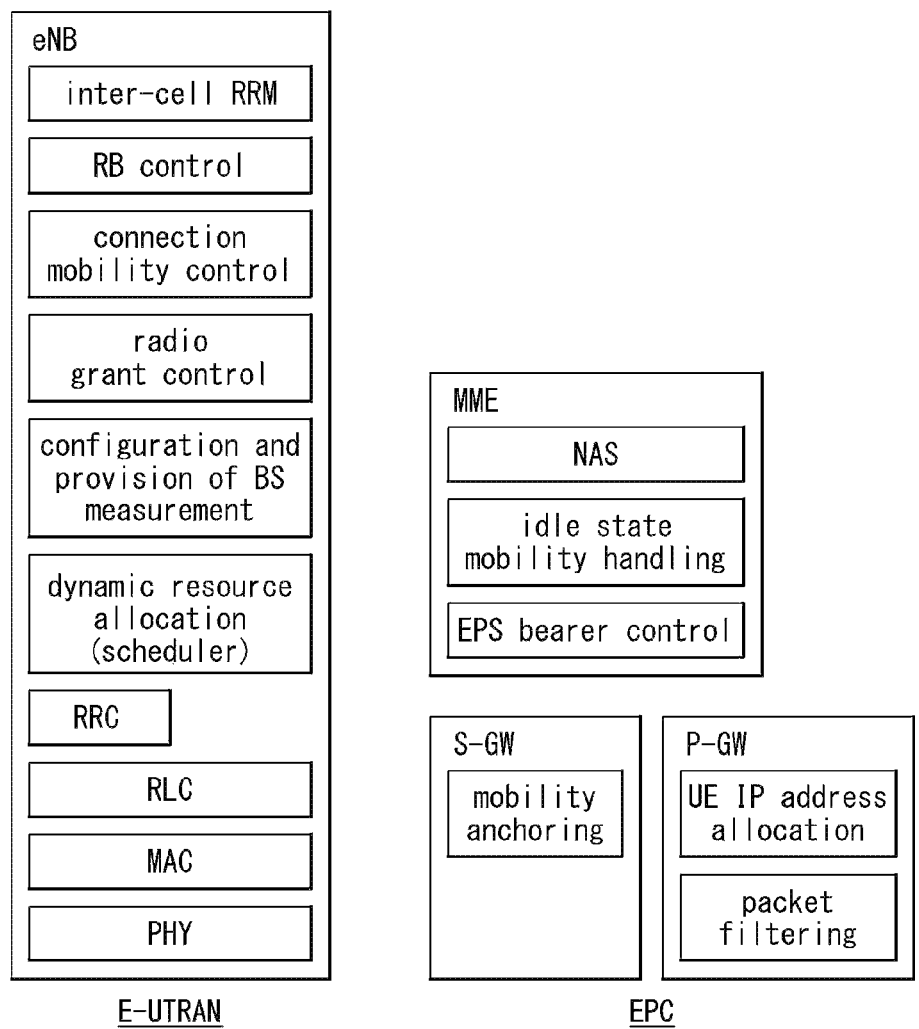

[FIG. 7]
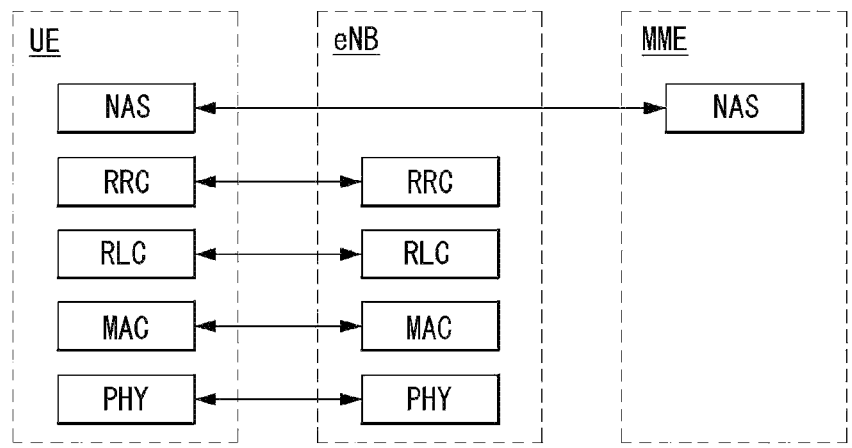
[FIG. 8]
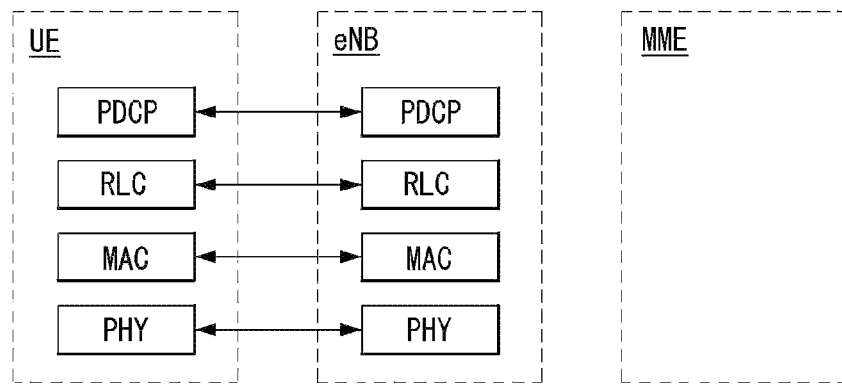

[FIG. 9]
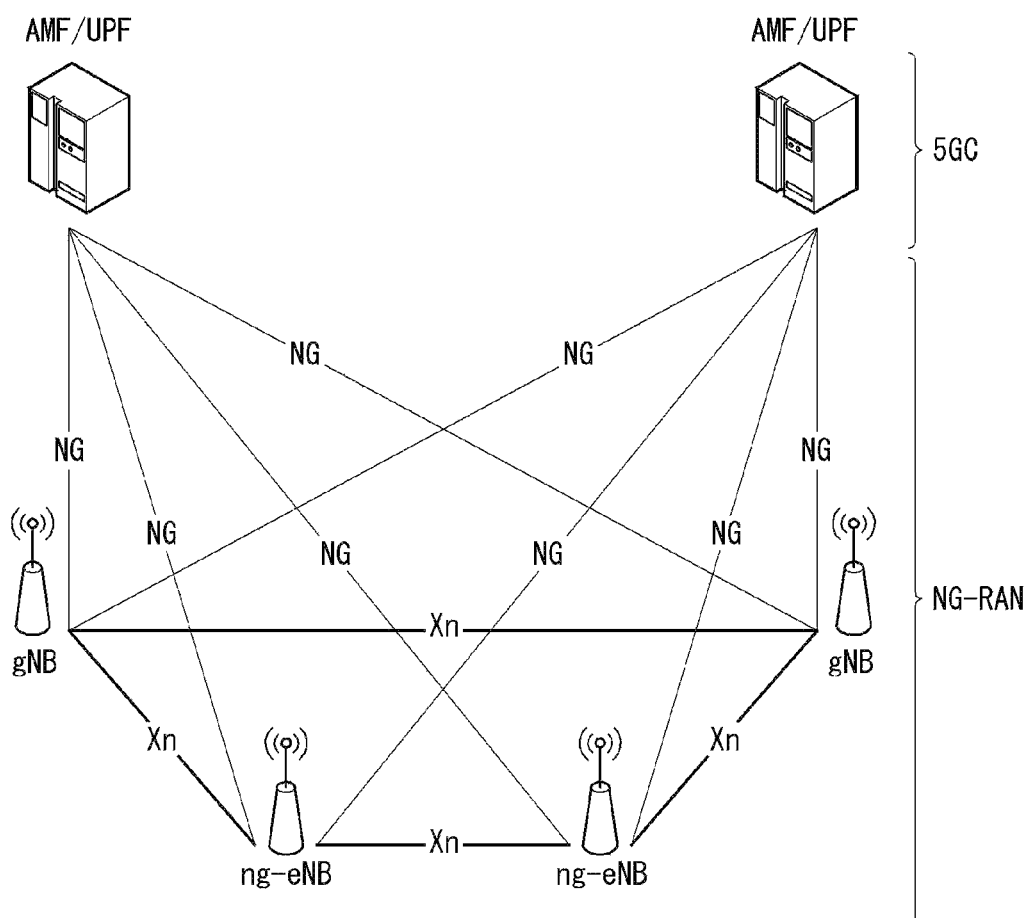

[FIG. 10]
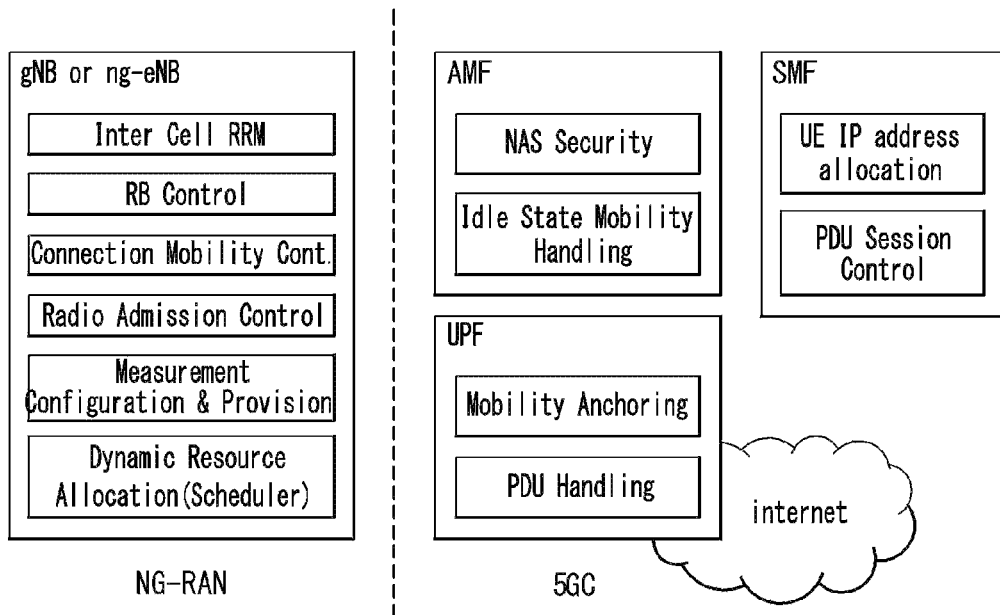
[FIG. 11]
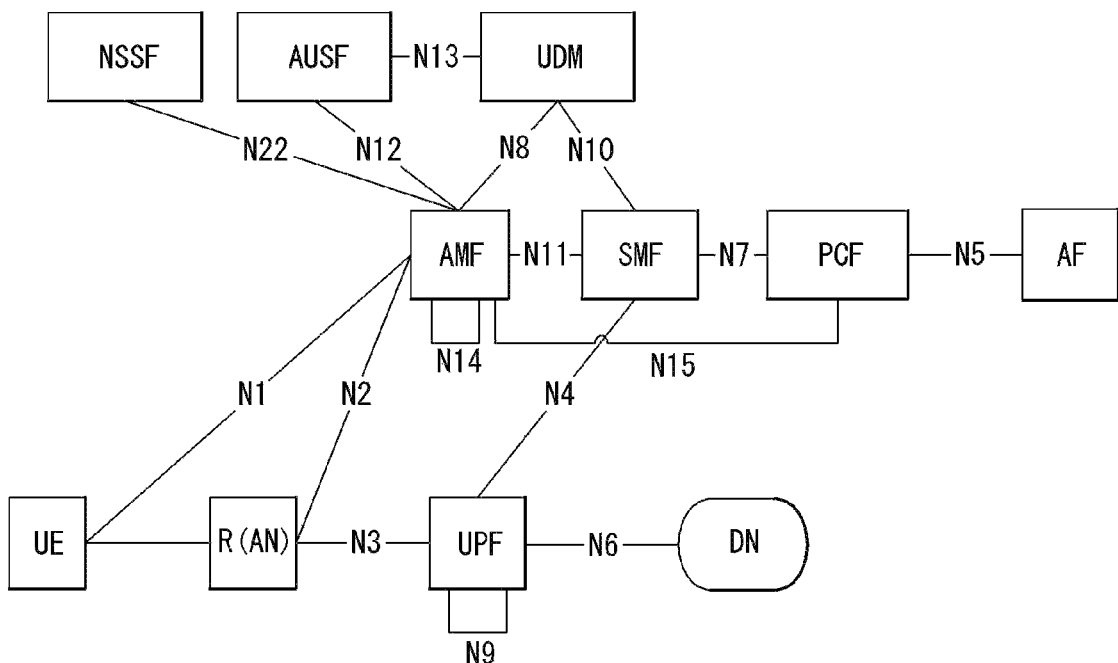

[FIG. 12]
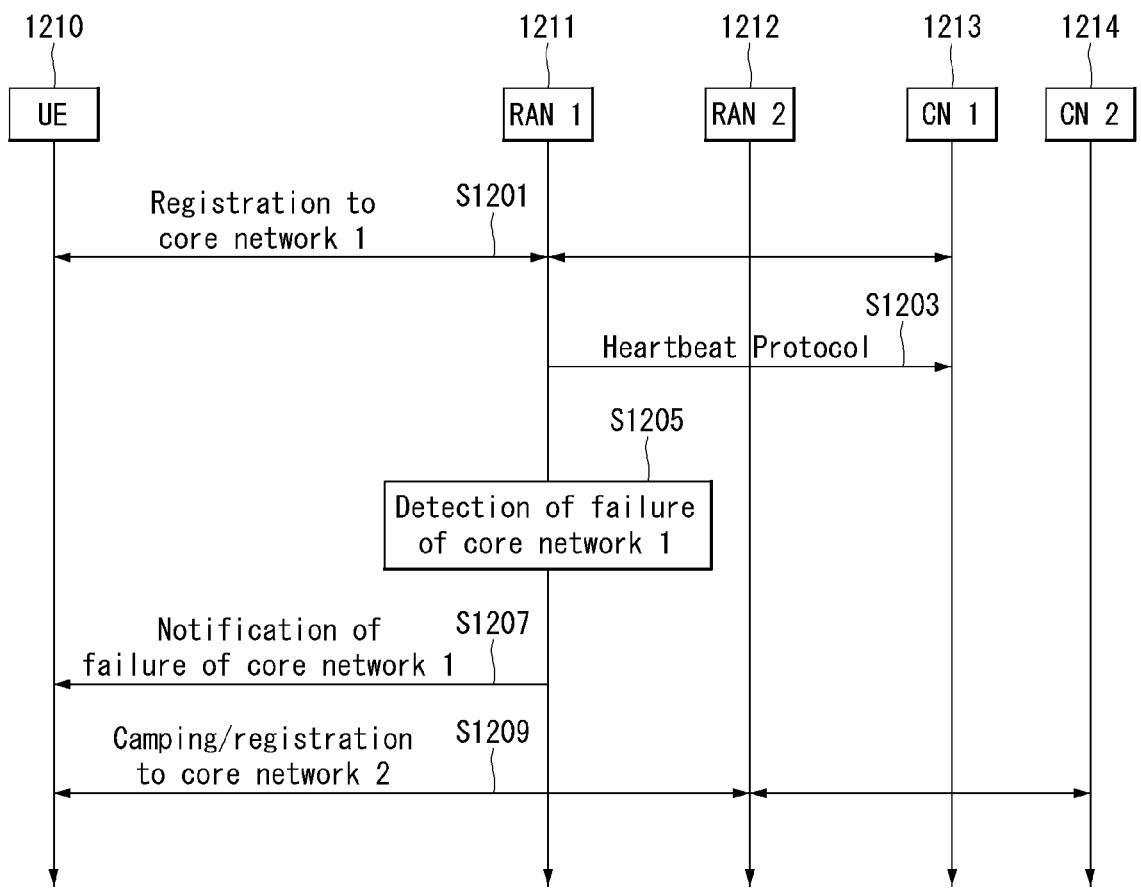

[FIG. 13]
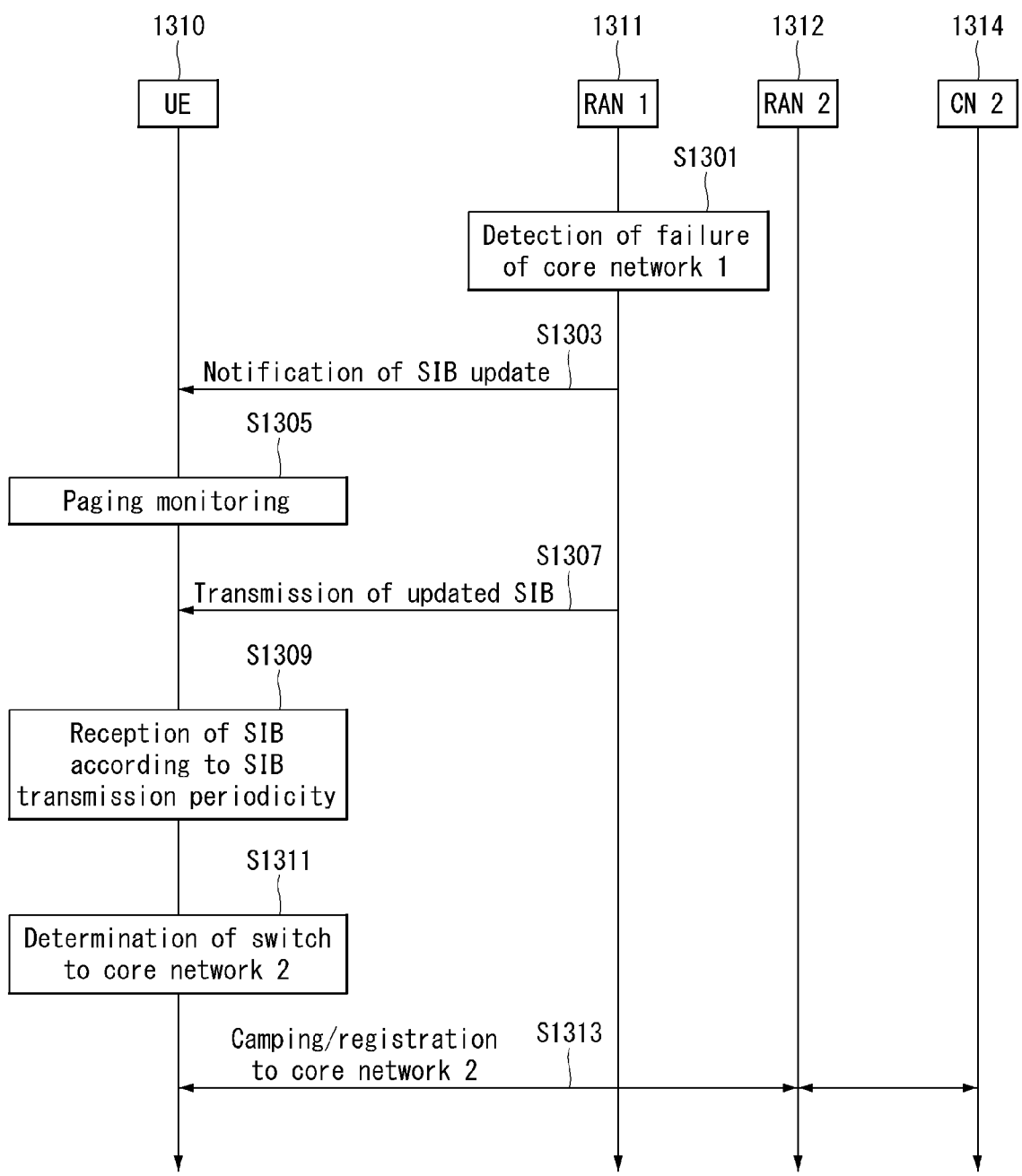

[FIG. 14]
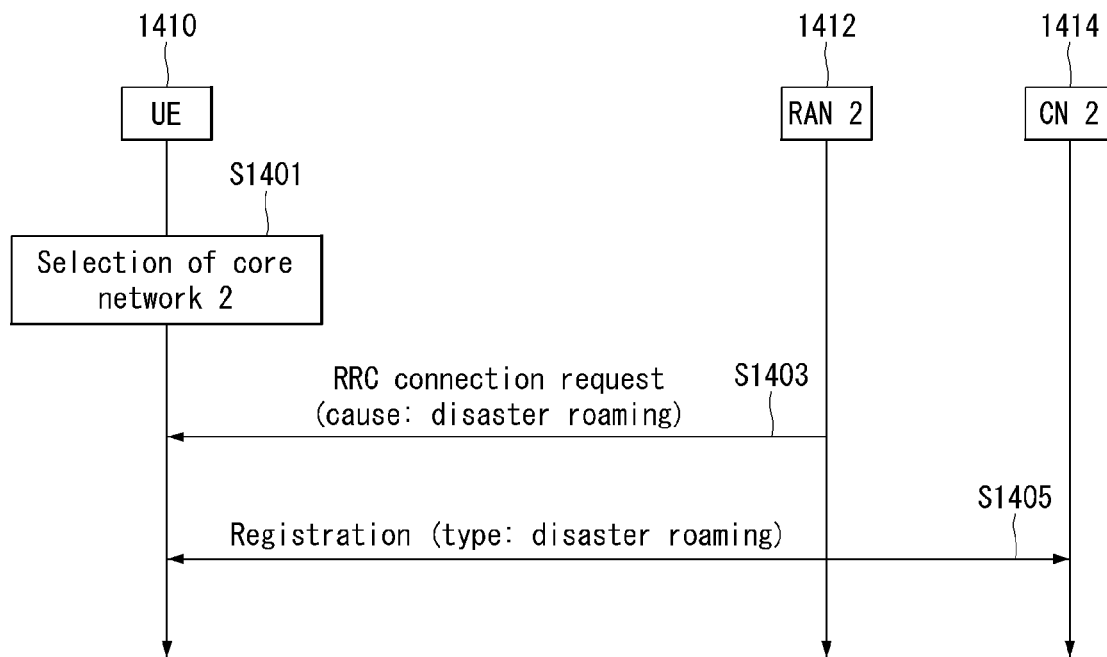
[FIG. 15]
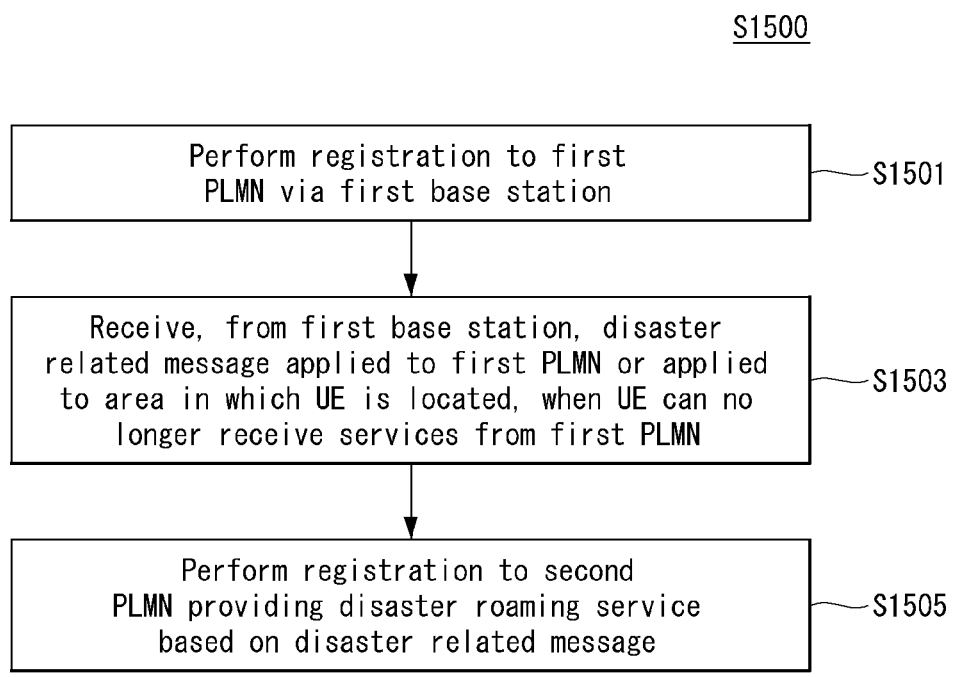

[FIG. 16]
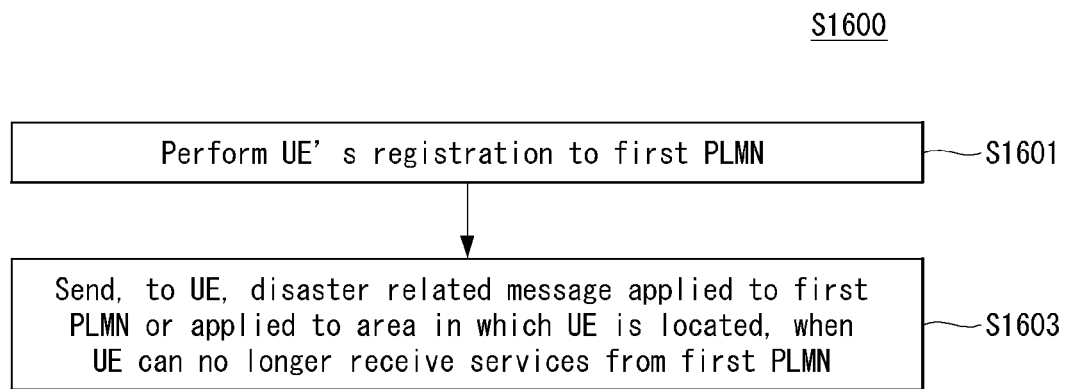
[FIG. 17]
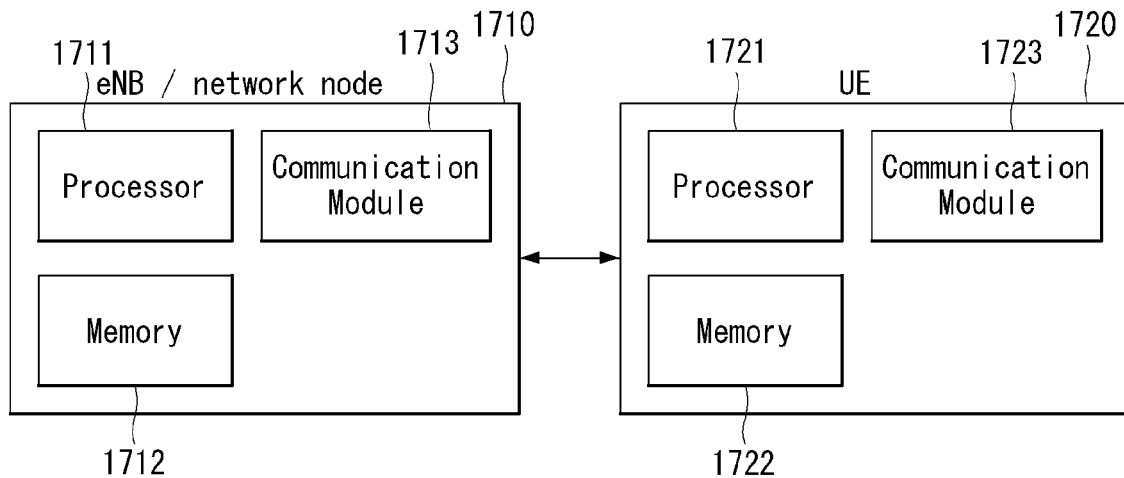

[FIG. 18]
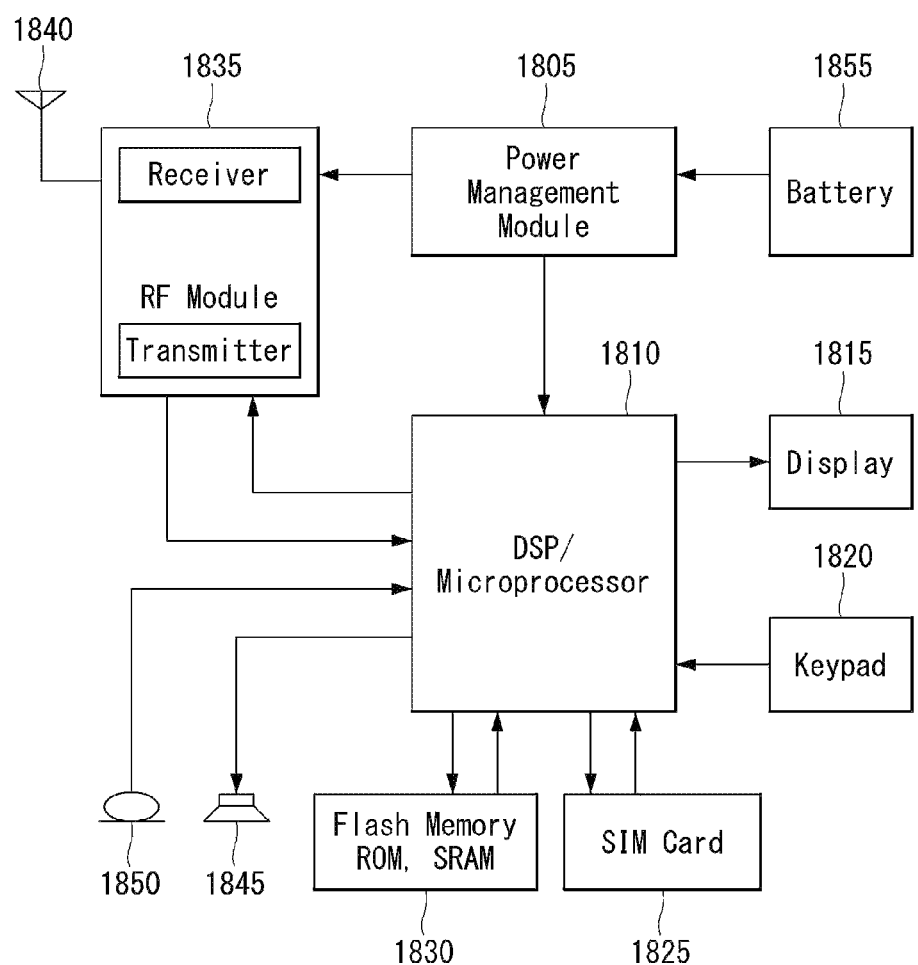

[FIG. 19]
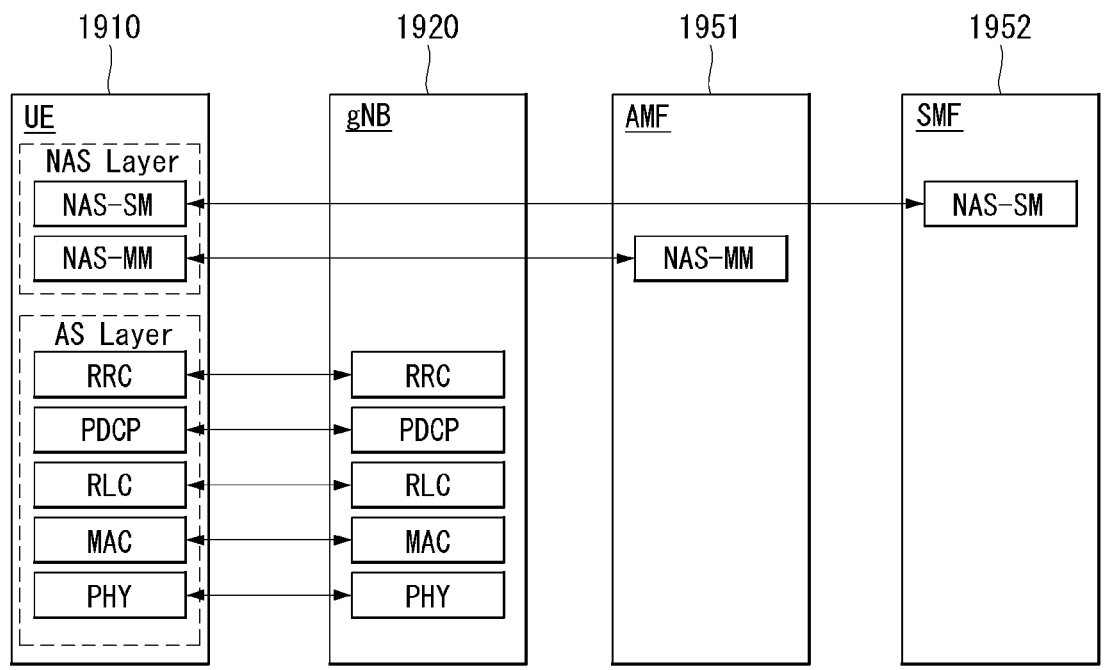

METHOD AND DEVICE FOR PERFORMING REGISTRATION IN NETWORK IN WIRELESS COMMUNICATION SYSTEM

CROSS-REFERENCE TO RELATED APPLICATIONS

This application is the National Stage filing under 35 U.S.C. 371 of International Application No. PCT/KR2020/000216, filed on Jan. 6, 2020, which claims the benefit of Korean Patent Application No. 10-2019-0001399, filed on Jan. 4, 2019, and Korean Patent Application No. 10-2019-0049042, filed on Apr. 26, 2019, the contents of which are all hereby incorporated by reference herein in their entirety.

TECHNICAL FIELD

The present disclosure relates to a wireless communication system, and more particularly to a method for performing, by a user equipment (UE) and a base station, UE's registration to a network in a wireless communication system, and a device therefor.

BACKGROUND ART

In a wireless communication system, mobile communication systems have been developed to provide a voice service while ensuring the activity of a user. However, the area of the mobile communication systems has extended to a data service in addition to a voice. Due to the current explosive increase in traffic, there is a shortage of resources, and thus users demand a higher speed service. Accordingly, there is a need for a more advanced mobile communication system.

Requirements for next-generation mobile communication systems need to able to support the accommodation of explosive data traffic, a dramatic increase in data rate per user terminal, the accommodation of a significant increase in the number of connected devices, very low end-to-end latency, and high-energy efficiency. To this end, studies have been conducted on various technologies such as dual connectivity, massive multiple input multiple output (MIMO), in-band full duplex, non-orthogonal multiple access (NOMA), super wideband support, and device networking.

DISCLOSURE

Technical Problem

An object of the present disclosure is to provide a method for performing roaming to a network of other available surrounding service provider and providing services, when a UE is located in a service provision area of a service provider to which the UE subscribes, but the service provider cannot temporarily provide services.

Another object of the present disclosure is to provide a communication system and method, in which a UE rapidly recognizes a problem in a network of a service operator, to which the UE subscribes, in a process in which the UE accesses a network of other service provider in an automatic network selection mode, and the UE moves to a new network and receives services without interruption of the service as much as possible.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

In one aspect, there is provided a method for performing, by a user equipment (UE), a registration to a network in a wireless communication system, the method comprising performing a registration to a first public land mobile network (PLMN) via a first base station; when there is no service provided from the first PLMN, receiving an disaster related message applied to the first PLMN or applied to an area in which the UE is located; transmitting a registration request message to a second PLMN providing an disaster roaming service based on the disaster related message; and receiving, from the second PLMN, a response message to the registration request message, wherein the UE is subscribed to the first PLMN, wherein the second PLMN is configured to provide the disaster roaming service to the UE based on a disaster applied to the first PLMN or applied to the area in which the UE is located.

The disaster related message includes an indicator indicating that the disaster roaming service is provided to UEs related to the first PLMN.

The disaster related message includes information representing that the disaster roaming service is configured to be provided to the UE related to the first PLMN.

The disaster related message is a system information block (SIB) message received to the UE according to a pre-configured periodicity.

The method further comprises transmitting an RRC connection request message to a second base station connected to the second PLMN, and receiving a response message to the RRC connection request message to establish an RRC connection with the second PLMN via the second base station. The RRC connection request message is transmitted due to a disaster roaming.

In another aspect, there is provided a user equipment (UE) performing a registration to a network in a wireless communication system, the UE comprising an RF module configured to transmit and receive a radio signal; at least one processor functionally connected to the RF module; and at least one computer memory operationally connected to the at least one processor, wherein the at least one computer memory is configured to, upon execution, store instructions that allow the at least one processor to perform a registration to a first public land mobile network (PLMN) via a first base station; when there is no service provided from the first PLMN, receive an disaster related message applied to the first PLMN or applied to an area in which the UE is located; transmit a registration request message to a second PLMN providing an disaster roaming service based on the disaster related message; and receive, from the second PLMN, a response message to the registration request message, wherein the UE is subscribed to the first PLMN, wherein the second PLMN is configured to provide the disaster roaming service to the UE based on a disaster applied to the first PLMN or applied to the area in which the UE is located.

The disaster related message includes an indicator indicating that the disaster roaming service is provided to UEs related to the first PLMN.

The disaster related message includes information representing that the disaster roaming service is configured to be provided to the UE related to the first PLMN.

The disaster related message is a system information block (SIB) message received to the UE according to a pre-configured periodicity.

The at least one processor is configured to transmit an RRC connection request message to a second base station connected to the second PLMN, and receive a response message to the RRC connection request message to establish an RRC connection with the second PLMN via the second base station, wherein the RRC connection request message is transmitted due to a disaster roaming.

Advantageous Effects

The present disclosure can prevent interruption of service that a UE has received from a specific network.

According to the present disclosure, a UE is capable of roaming movement to other network even in a disaster situation occurring in a specific network, and thus a user can continuously use communication services even in an interruption situation of communication services.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and serve to explain technical features of the present disclosure together with the description.

FIG. 1 illustrates an AI device 100 according to an embodiment of the present disclosure.

FIG. 2 illustrates an AI server 200 according to an embodiment of the present disclosure.

FIG. 3 illustrates an AI system 1 according to an embodiment of the present disclosure.

FIG. 4 illustrates various reference points.

FIG. 5 illustrates an example of a network structure of an evolved universal terrestrial radio access network (E-UTRAN) to which the present disclosure is applicable.

FIG. 6 illustrates an example of a general architecture of E-UTRAN and EPC.

FIG. 7 illustrates an example of a structure of a radio interface protocol in a control plane between a UE and eNB.

FIG. 8 illustrates an example of a structure of a radio interface protocol in a user plane between a UE and eNB.

FIG. 9 illustrates a general architecture of NR-RAN.

FIG. 10 illustrates an example of general functional split between NG-RAN and SGC.

FIG. 11 illustrates an example of a general architecture of 5G.

FIG. 12 is a flow chart illustrating an example of selecting a PLMN according to an embodiment of the present disclosure.

FIG. 13 is a flow chart illustrating a PLMN selection procedure according to method 2-1.

FIG. 14 is a flow chart illustrating a PLMN selection procedure according to method 4.

FIG. 15 is a flow chart illustrating a method for a UE to perform a registration to a network in accordance with an embodiment of the present disclosure.

FIG. 16 is a flow chart illustrating a method for a base station to register a UE to a network in accordance with an embodiment of the present disclosure.

FIG. 17 illustrates a block diagram of configuration of a communication device according to an embodiment of the present disclosure.

FIG. 18 illustrates a block diagram of configuration of a communication device according to an embodiment of the present disclosure.

FIG. 19 illustrates an example of a structure of a radio interface protocol in a control plane between a UE and eNodeB.

MODE FOR INVENTION

Reference will now be made in detail to embodiments of the disclosure, examples of which are illustrated in the accompanying drawings. A detailed description to be disclosed below together with the accompanying drawing is to describe exemplary implementations of the present disclosure and not to describe a unique implementation for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

Description of Terms in the Present Disclosure

In the present disclosure, a base station (BS) refers to a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced by terms such as a fixed station, Node B, evolved-NodeB (eNB), a base transceiver system (BTS), an access point (AP), and gNB (general NB). Further, a 'terminal' may be fixed or movable and may be replaced by terms such as user equipment (UE), a mobile station (MS), a user terminal (UT), a mobile subscriber station (MSS), a subscriber station (SS), an advanced mobile station (AMS), a wireless terminal (WT), a machine type communication (MTC) device, a machine-to-machine (M2M) device, and a device-to-device (D2D) device.

In the present disclosure, downlink (DL) refers to communication from the base station to the terminal, and uplink (UL) refers to communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and non-orthogonal multiple access (NOMA).

The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, and E-UTRA (evolved UTRA). The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in downlink and adopts the SC-FDMA in uplink. LTE-advanced (A) is an evolution of the 3GPP LTE.

Embodiments of the present disclosure can be supported by standard documents disclosed in at least one of the IEEE 802, 3GPP, and 3GPP2 specifications regarding wireless access systems. In other words, in embodiments of the present disclosure, those steps or parts omitted for the purpose of clearly describing technical principles of the present disclosure can be supported by the standard documents. All the terms disclosed in the present disclosure can also be explained by the standard documents.

3GPP LTE/LTE-A is primarily described for clear description, but technical features of the present disclosure are not limited thereto.

Terms used in the present disclosure are defined as follows.

IP Multimedia Subsystem or IP Multimedia Core Network Subsystem (IMS): an architectural framework for providing standardization for delivering voice or other multimedia services on internet protocol (IP).

Universal Mobile Telecommunication System (UMTS): the 3rd generation mobile communication technology based on global system for mobile communication (GSM) developed by the 3GPP.

Evolved Packet System (EPS): a network system consisting of an evolved packet core (EPC), that is an internet protocol (IP) based packet switched core network, and an access network such as LTE and UTRAN. The EPS is a network of an evolved version of UMTS.

NodeB: a base station of a UMTS network. It is installed outdoor, and its coverage has a scale of a macro cell.

eNodeB: a base station of an EPS network. It is installed outdoor, and its coverage has a scale of a macro cell.

Home NodeB: it is installed indoors as a base station of the UMTS network, and its coverage has a scale of a macro cell.

Home eNodeB: it is installed indoors as a base station of the EPS network, and its coverage has a scale of a macro cell.

User Equipment (UE): the UE may refer to terms such as a terminal, a mobile equipment (ME), and a mobile station (MS). The UE can be a portable device such as a notebook computer, a cellular phone, a personal digital assistant (PDA), a smart phone, and a multimedia device, or a non-portable device such as a personal computer (PC) and a vehicle-mounted device. The term of UE may refer to an MTC UE in the description related to MTC.

Machine Type Communication (MTC): communication performed by machines without human intervention. It may be called Machine-to-Machine (M2M) communication.

MTC terminal (MTC UE or MTC device or MTC apparatus): a terminal (e.g., a vending machine, meter, etc.) having a communication function (e.g., communication with an MTC server over PLMN) over a mobile communication network and performing a MTC function.

Radio Access Network (RAN): a unit including a Node B and a radio network controller (RNC) and eNodeB controlling the Node B in the 3GPP network. The RAN exists at a UE end and provides a connection to a core network.

Home Location Register (HLR)/Home Subscriber Server (HSS): a database containing subscriber information within the 3GPP network. The HSS can perform functions such as configuration storage, identity management, user state storage, etc.

Public Land Mobile Network (PLMN): a network configured for the purpose of providing mobile communication services to individuals. The PLMN can be configured for each operator.

Non-Access Stratum (NAS): a functional layer for exchanging signalling and a traffic message between a UE and a core network at the UMTS and EPS protocol stacks. The NAS mainly functions to support mobility of the UE and support a session management procedure for establishing and maintaining an IP connection between the UE and PDN GW.

Service Capability Exposure Function (SCEF): an entity within the 3GPP architecture for service capability exposure that provides a means to safely expose the services and capabilities provided by 3GPP network interfaces.

Mobility Management Entity (MME): a network node in the EPS network which performs mobility management and session management functions.

Packet Data Network Gateway (PDN-GW): a network node in the EPS network which performs UE IP address allocation, packet screening and filtering, and charging data collection functions.

Serving GW (Serving Gateway): a network node in the EPS network which performs functions such as mobility anchor, packet routing, idle mode packet buffering, and triggering of paging for the UE of MME.

Policy and Charging Rule Function (PCRF): a node in the EPS network which performs policy decision to dynamically apply differentiated QoS and billing policies per each service flow.

Open Mobile Alliance Device Management (OMA DM): A protocol designed to manage mobile devices, such as mobile phones, PDAs, and portable computers, which performs functions such as device configuration, firmware upgrade, and error report Operation Administration and Maintenance (OAM): A network management function group which provides network fault indication, performance information, and data and diagnostic functions.

Packet Data Network (PDN): a network in which a server (e.g., MMS server, WAP server, etc.) supporting a specific service is located.

PDN connection: a connection from the UE to the PDN, i.e., the association (connection) between the UE represented by the IP address and the PDN represented by the APN.

EPS Mobility Management (EMM): a sublayer of the NAS layer, where the EMM may be in an "EMM-Registered" or "EMM-Deregistered" state depending on whether the UE is network attached or detached.

EMM Connection Management (ECM) connection: A signaling connection for the exchange of NAS messages, established between the UE and the MME. An ECM connection is a logical connection consisting of an RRC connection between the UE and an eNB and S1 signaling connection between the eNB and the MME. When the ECM connection is established/terminated, the RRC and S1 signaling connections are established/terminated as well. To the UE, the established ECM connection means having an RRC connection established with the eNB, and to the MME, it means having an S1 signaling connection established with the eNB. Depending on whether the NAS signaling connection, i.e., the ECM connection is established, the ECM may have an "ECM-Connected" or "ECM-Idle" state.

Access-Stratum (AS): It includes a protocol stack between the UE and the radio (or access) network and is responsible for transmitting data and network control signals.

NAS configuration Management Object (MO): A management object (MO) used to configure the UE with parameters related to NAS functionality.

Packet Data Network (PDN): A network in which a server (e.g., multimedia messaging service (MMS) server, wireless application protocol (WAP) server, etc.) supporting a specific service is located.

PDN connection: a logical connection between the UE and the PDN, represented by one IP address (one IPv4 address and/or one IPv6 prefix).

Access Point Name (APN): a string that refers to or identifies a PDN. In order to access the requested service or network, it goes through a specific P-GW, which means a predefined name (string) in the network so that the P-GW can be found. (e.g., internet.mnc012.mcc345.gprs)

Access Network Discovery and Selection Function (ANDSF): it is a network entity and provides policies that allow the UE to discover and select an available access on a per operator basis.

EPC path (or infrastructure data path): a user plane communication path through EPC.

E-UTRAN Radio Access Bearer (E-RAB): it refers to the concatenation of a S1 bearer and a corresponding data radio bearer. If there is an E-RAB, there is an one-to-one mapping between the E-RAB and the EPS bearer of the NAS.

GPRS Tunneling Protocol (GTP): a group of IP-based communications protocols used to carry general packet radio service (GPRS) within GSM, UMTS and LTE networks. Within the 3GPP architecture, GTP and proxy mobile IPv6-based interfaces are specified on various interface points. GTP can be decomposed into several protocols (e.g., GTP-C, GTP-U and GTP'). GTP-C is used within a GPRS core network for signalling between gateway GPRS support nodes (GGSN) and serving GPRS support nodes (SGSN). GTP-C allows the SGSN to activate a session (e.g., PDN context activation), deactivate the same session, adjust the quality of service parameters, or renew a session for a subscriber, that has just operated from another SGSN, for the user. GTP-U is used to carry user data within the GPRS core network and between the radio access network and the core network.

Cell as a radio resource: the 3GPP LTE/LTE-A system has used a concept of a cell to manage radio resources, and a cell related to the radio resource is distinguished from a cell of a geographic area. The "cell" related to the radio resource is defined as a combination of downlink (DL) resources and uplink (UL) resources, i.e., a combination of DL carriers and UL carriers. The cell may be configured with DL resource only or a combination of DL resources and UL resources. If carrier aggregation is supported, a linkage between a carrier frequency of the DL resource and a carrier frequency of the UL resource may be indicated by system information. Here, the carrier frequency refers to a center frequency of each cell or carrier. In particular, a cell operating on a primary frequency is called a primary cell or Pcell, and a cell operating on a secondary frequency is called a secondary cell or Scell. The Scell refers to a cell that can be configured after radio resource control (RRC) connection establishment is achieved and can be used for providing additional radio resources. Depending on capabilities of the UE, the Scell together with the Pcell can form a set of serving cells for the UE. For the UE that is in a RRC_CONNECTED state but is not configured with carrier aggregation, or does not support carrier aggregation, there is only one serving cell configured with only the Pcell. The "cell" of the geographic area can be understood as a coverage in which a node can provide services using a carrier, and the "cell" of the radio resource is related to a bandwidth (BW) that is a frequency range configured by the carrier. Since a downlink coverage that is a range within which the node can transmit a valid signal and an uplink coverage that is a range within which the node can receive the valid signal from the UE depend on the carrier carrying the corresponding signal, the coverage of the node is associated with the coverage of the "cell" of the radio resource the node uses. Thus, the term "cell" may be used to sometimes denote the coverage of the service by the node, sometimes denote the radio resource, and sometimes denote a range that a signal using the radio resources can reach with a valid strength.

The EPC is a key element of system architecture evolution (SAE) to improve the performance of 3GPP technologies. The SAE corresponds to a research project to determine a network structure supporting mobility between various kinds of networks. The SAE aims to provide an optimized packet-based system, for example, supporting various radio access technologies on an IP basis and providing more improved data transfer capability.

More specifically, the EPC is a core network of an IP mobile communication system for the 3GPP LTE system and can support packet-based real-time and non-real time services. In the existing mobile communication system (i.e., in the 2nd or 3rd mobile communication system), functions of the core network have been implemented through two separate sub-domains including a circuit-switched (CS) sub-domain for voice and a packet-switched (PS) sub-domain for data. However, in the 3GPP LTE system that is an evolution of the 3rd mobile communication system, the CS and PS sub-domains have been unified into a single IP domain. That is, in the 3GPP LTE system, a connection between UEs having IP capabilities can be configured via an IP-based base station (e.g., evolved Node B (eNodeB)), an EPC, and an application domain (e.g., IP multimedia subsystem (IMS)). In other words, the EPC is an essential architecture to implement end-to-end IP services.

The EPC may include various components, and FIG. 1 illustrates some of the EPC components, including a serving gateway (SGW), a packet data network gateway (PDN GW), a mobility management entity (MME), a SGSN (serving GPRS (general packet radio service) supporting node), and an enhanced packet data gateway (ePDG).

The SGW (or S-GW) operates as a boundary point between a radio access network (RAN) and a core network, and is an element that functions to maintain a data path between the eNB and the PDN GW. Further, if the UE moves across areas served by the eNB, the SGW serves as a local mobility anchor point. That is, packets can be routed through the SGW for mobility within the E-UTRAN (evolved-universal mobile telecommunications system (UMTS) terrestrial radio access network defined in 3GPP Release-8 or later). The SGW may also serve as an anchor point for mobility with other 3GPP networks (RAN defined before 3GPP Release-8, for example, UTRAN or GERAN (global system for mobile communication (GSM)/enhanced data rates for global evolution (EDGE) radio access network).

The PDN GW (or P-GW) corresponds to a termination point of a data interface to a packet data network. The PDN GW can support policy enforcement features, packet filtering, charging support, and the like. In addition, the PDN GW can serve as an anchor point for mobility management between the 3GPP network and a non-3GPP network (e.g., untrusted networks such as an interworking wireless local area network (I-WLAN) or trusted networks such as a code division multiple access (CDMA) network and Wimax).

Hereinafter, the present disclosure is described based on the terms defined as above.

Three major requirement areas of 5G include (1) an enhanced mobile broadband (eMBB) area, (2) a massive machine type communication (mMTC) area, and (3) an ultra-reliable and low latency communications (URLLC) area.

Some use cases may require multiple areas for optimization, and other use cases may focus on only one key performance indicator (KPI). 5G supports these various use cases in a flexible and reliable method.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity in which they are always turned on in order to push real-time information and notification to a user. A cloud storage and application suddenly increases in the mobile communication platform, and this can be applied to both business and entertainment. Furthermore, the cloud storage is a special use case that tows the growth of an uplink data transfer rate. 5G is also used for remote business of cloud. When a tactile interface is used, further lower end-to-end latency is required to maintain better user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use cases relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link with ultra reliability/low available latency, such as a self-driving vehicle. A level of reliability and latency is essential for smart grid control, industry automation, robot engineering, drone control and adjustment.

Multiple use cases are described in more detail below.

5G can supplement fiber-to-the-home (FTTH) and cable-based broadband (or DOCSIS) as means for providing a stream evaluated from several hundreds of megabits per second to gigabits per second. Such fast speed is required to deliver TV with a resolution of 4K or more (6K, 8K or more) in addition to virtual reality and augmented reality. Virtual reality (VR) and augmented reality (AR) applications include immersive sports games. A specific application program may require a special network configuration. For example, in VR games, in order for game companies to minimize latency, a core server may need to be integrated with the edge network server of a network operator.

An automotive is expected to be an important and new motive power in 5G, along with many use cases for the mobile communication of an vehicle. For example, entertainment for a passenger requires a high capacity and a high mobility mobile broadband at the same time. This reason is that future users continue to expect a high-quality connection regardless of their location and speed. Another use example of the automotive field is an augmented reality dashboard. The augmented reality dashboard overlaps and displays information, that identifies an object in the dark and notifies a driver of the distance and movement of the object, over a thing seen by the driver through a front window. In the future, a wireless module enables communication between vehicles, information exchange between a vehicle and a supported infrastructure, and information exchange between a vehicle and other connected devices (e.g., devices accompanied by a pedestrian). A safety system guides alternative courses of a behavior so that a driver can drive more safely, thereby reducing a danger of an accident. A next stage will be a remotely controlled or self-driven vehicle. This requires very reliable, very fast communication between different self-driven vehicles and between an automotive and infra. In the future, a self-driving vehicle can perform all driving activities, and a driver will focus on only abnormal traffics, which cannot be identified by a vehicle itself. Technical requirements of a self-driving vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. Similar configuration may be performed for each home. All of a temperature sensor, a window and heating controller, a burglar alarm and home appliances are wirelessly connected. Many of these sensors are typically a low data transfer rate, low energy and low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of suppliers and consumers, and thus the smart grid may improve the distribution of fuel, such as electricity, in an efficient, reliable, economical, production-sustainable and automated manner. The smart grid may be considered to be another sensor network with low latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, achieving the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically demands a low data speed, but requires a wide area and reliable location information.

Embodiments of the present disclosure to be described below can be implemented through the combination or the modification in order to meet the 5G requirements described above.

The following is described in detail in relation to the technical field to which embodiments of the present disclosure to be described below can be applied.

Artificial Intelligence (AI)

Artificial intelligence means the field in which artificial intelligence or methodology capable of making the artificial intelligence is researched. Machine learning means the field in which various problems handled in the artificial intelligence field are defined and methodology for solving the problems is researched. Machine learning is also defined as an algorithm for improving performance of a task through continuous experiences for the task.

An artificial neural network (ANN) is a model used in machine learning, and may refer to the entire model with a problem-solving ability which consists of artificial neurons (nodes) forming a network through a combination of synapses. The artificial neural network may be defined by a connection pattern between neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weights, and bias that are input through a synapse.

A model parameter means a parameter determined through learning, and includes the weight of a synapse connection and the bias of a neuron. Furthermore, a hyper parameter refers to a parameter that shall be configured before learning in a machine learning algorithm, and includes a learning rate, the number of times of repetitions, a mini-deployment size, and an initialization function.

The purpose of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. The deep learning is part of the machine learning. Hereinafter, the machine learning is used as a meaning including the deep learning.

Robot

A robot may mean a machine that automatically processes a given task or operates based on an autonomously owned ability. Particularly, a robot having a function for recognizing and autonomously determining an environment and performing an operation may be called an intelligent robot.

The robot may be classified for industry, medical treatment, home, and military based on its use purpose or field.

The robot includes a driver including an actuator or motor, and can perform various physical operations, such as moving a robot joint. Furthermore, a movable robot includes a wheel, a brake, a propeller, etc. in the driver, and may run on the ground or fly in the air through the driver.

Self-Driving (Autonomous-Driving)

Self-driving means a technology for autonomous driving. A self-driving vehicle means a vehicle that runs without user manipulation or by user's minimum manipulation.

For example, self-driving may include all of a technology for maintaining a driving lane, a technology for automatically controlling speed such as adaptive cruise control, a technology for automatically driving along a fixed path, a technology for automatically setting and driving a path when a destination is set, and the like.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this instance, the self-driving vehicle may be considered as a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object together. However, there is a difference in that a virtual object is used to supplement a real object in the AR technology, and on the other hand, a virtual object and a real object are used as the same character in the MR technology.

The XR technology can be applied to a head-mount display (HMD), a head-up display (HUD), a mobile phone, a tablet PC, a laptop, a desktop, TV, a digital signage, and the like. A device to which the XR technology is applied may be called an XR device.

FIG. 1 illustrates an AI device 100 according to an embodiment of the present disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices, such as other AI devices 100a to 100e or an AI server 200, using wired and wireless communication technologies. For example, the communication unit 110 may transmit and receive sensor information, a user input, a learning model, and a control signal to and from the external devices.

Examples of communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™ radio frequency identification (RFID), infrared data association (IrDA), ZigBee, near field communication (NFC), etc.

The input unit 120 may obtain various types of data.

The input unit 120 may include a camera for an image signal input, a microphone for receiving an audio signal, a user input unit for receiving information from a user, etc. Herein, the camera or the microphone is treated as a sensor, and thus a signal obtained from the camera or the microphone may be referred to as sensing data or sensor information.

The input unit 120 can obtain learning data for model learning and input data to be used when an output is obtained using a learning model. The input unit 120 can obtain not-processed input data. In this case, the processor 180 or the learning processor 130 can extract an input feature by performing pre-processing on the input data.

The learning processor 130 may be trained by a model constructed by an artificial neural network using learning data. In this case, the trained artificial neural network may be called a learning model. The learning model may be used to deduce a result value of new input data not learning data, and the deduced value may be used as a base for performing a given operation.

The learning processor 130 can perform AI processing along with a learning processor 240 of the AI server 200.

The learning processor 130 may include a memory integrated or implemented in the AI device 100. Alternatively, the learning processor 130 may be implemented using the memory 170, an external memory directly coupled to the AI device 100, or a memory maintained in an external device.

The sensing unit 140 can obtain at least one of internal information of the AI device 100, surrounding environment information of the AI device 100, or user information using various sensors.

Examples of sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 can generate an output related to a visual sense, an auditory sense or a tactile sense.

The output unit 150 may include a display for outputting visual information, a speaker for outputting auditory information, and a haptic module for outputting tactile information.

The memory 170 can store data supporting various functions of the AI device 100. For example, the memory 170 can store input data obtained by the input unit 120, learning data, a learning model, a learning history, etc.

The processor 180 can determine at least one executable operation of the AI device 100 based on information that is determined or generated using a data analysis algorithm or a machine learning algorithm. Furthermore, the processor 180 can perform operation determined by controlling the components of the AI device 100.

To this end, the processor 180 can request, search, receive, or utilize data of the learning processor 130 or the memory 170, and can control the components of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 can obtain intention information for a user input and transmit user requirements based on the obtained intention information.

The processor 180 can obtain the intention information corresponding to the user input using at least one of a speech to text (STT) engine for converting a voice input into a text string or a natural language processing (NLP) engine for obtaining intention information of a natural language.

In this case, at least one of the STT engine or the NLP engine may be constructed by an artificial neural network of which at least a portion is trained according to a machine learning algorithm. Furthermore, at least one of the STT engine or the NLP engine may have been trained by the learning processor 130, may have been trained by the learning processor 240 of the AI server 200, or may have been trained by distributed processing thereof.

The processor 180 may collect history information including the feedback, etc. of the user for the operation contents or an operation of the AI device 100, and may store the history information in the memory 170 or the learning processor 130 or may transmit the history information to an external device such as the AI server 200. The collected history information may be used to update a learning model.

The processor 180 may control at least some of the components of the AI device 100 in order to run an application program stored in the memory 170. Moreover, the processor 180 may combine and operate two or more of the components included in the AI device 100 in order to run the application program.

FIG. 2 illustrates an AI server 200 according to an embodiment of the present disclosure.

Referring to FIG. 2, the AI server 200 may refer to a device which is trained by an artificial neural network using a machine learning algorithm or which uses a trained artificial neural network. Herein, the AI server 200 consists of a plurality of servers and may perform distributed processing and may be defined as a 5G network. Further, the AI server 200 may be included as a partial configuration of the AI device 100 and may perform at least a part of AI processing.

The AI server 200 may include a communication unit 210, a memory 230, a learning processor 240, and a processor 260.

The communication unit 210 may transmit and receive data to and from an external device such as the AI device 100.

The memory 230 may include a model storage unit 231. The model storage unit 231 may store a model (or artificial neural network 231*a*) which is being trained or has been trained through the learning processor 240.

The learning processor 240 may train the artificial neural network 231*a* using learning data. The learning model may be used in the state in which it has been mounted on the AI server 200 of the artificial neural network, or may be mounted on an external device such as the AI device 100 and used.

The learning model may be implemented as hardware, software or a combination of hardware and software. If a part or all of the learning model is implemented as software, one or more instructions constructing the learning model may be stored in the memory 230.

The processor 260 may deduce a result value of new input data using the learning model and generate a response or a control command based on the deduced result value.

FIG. 3 illustrates an AI system 1 according to an embodiment of the present disclosure.

Referring to FIG. 3, in the AI system 1, at least one of the AI server 200, a robot 100*a*, a self-driving vehicle 100*b*, an XR device 100*c*, a smartphone 100*d*, or home appliances 100*e* is connected to a cloud network 10. The robot 100*a*, the self-driving vehicle 100*b*, the XR device 100*c*, the smartphone 100*d* or the home appliances 100*e* to which the AI technology is applied may be called AI devices 100*a* to 100*e*.

The cloud network 10 may constitute part of cloud computing infra or may mean a network present within cloud computing infra. The cloud network 10 may be configured using the 3G network, the 4G or long term evolution (LTE) network, or the 5G network.

That is, the devices 100*a* to 100*e* and 200 constituting the AI system 1 may be interconnected over the cloud network 10. In particular, the devices 100*a* to 100*e* and 200 may communicate with each other through a base station, or may directly communicate with each other without the intervention of the base station.

The AI server 200 may include a server for performing AI processing and a server for performing calculation on big data.

The AI server 200 is connected to at least one of the robot 100*a*, the self-driving vehicle 100*b*, the XR device 100*c*, the smartphone 100*d* or the home appliances 100*e*, that are AI devices constituting the AI system 1, over the cloud network 10, and may help at least part of the AI processing of the connected AI devices 100*a* to 100*e*.

The AI server 200 can train an artificial neural network based on a machine learning algorithm in place of the AI devices 100*a* to 100*e*, and can directly store a learning model or transmit the learning model to the AI devices 100*a* to 100*e*.

The AI server 200 can receive input data from the AI devices 100*a* to 100*e*, deduce a result value of the received input data using the learning model, generate a response or control command based on the deduced result value, and transmit the response or control command to the AI devices 100*a* to 100*e*.

Alternatively, the AI devices 100*a* to 100*e* can directly deduce a result value of input data using a learning model, and can generate a response or a control command based on the deduced result value.

Various implementations of the AI devices 100*a* to 100*e* to which the above-described technologies are applied are described below. Herein, the AI devices 100*a* to 100*e* illustrated in FIG. 3 may be considered as detailed implementations of the AI device 100 illustrated in FIG. 1.

AI and Robot to which the Present Disclosure is Applicable

The AI technology is applied to the robot 100*a*, and the robot 100*a* may be implemented as a guidance robot, a transport robot, a cleaning robot, a wearable robot, an entertainment robot, a pet robot, an unmanned aerial robot, etc.

The robot 100*a* may include a robot control module for controlling an operation. The robot control module may mean a software module or a chip in which a software module is implemented using hardware.

The robot 100*a* may obtain status information of the robot 100*a*, detect (recognize) a surrounding environment and an object, generate map data, determine a moving path and a running plan, determine a response to a user interaction, or determine an operation, using sensor information obtained from various types of sensors.

The robot 100*a* may use sensor information obtained by at least one sensor of LIDAR, a radar, and a camera in order to determine the moving path and the running plan.

The robot 100*a* may perform the above operations using a learning model consisting of at least one artificial neural network. For example, the robot 100*a* may recognize a surrounding environment and an object using the learning model, and determine an operation using the recognized surrounding environment information or object information. Herein, the learning model may have been directly trained in the robot 100*a* or may have been trained in an external device such as the AI server 200.

The robot 100*a* may directly generate results using the learning model and perform an operation, but may perform an operation by transmitting sensor information to an external device such as the AI server 200 and receiving results generated in response to this.

The robot 100*a* may determine the moving path and the running plan using at least one of map data, object information detected from sensor information, or object information obtained from the external device. The robot 100*a* may run along the determined moving path and running plan by controlling the driver.

The map data may include object identification information for various objects disposed in the space in which the robot 100*a* moves. For example, the map data may include object identification information for fixed objects, such as a wall and a door, and movable objects, such as a flowerport and a desk. Furthermore, the object identification information may include a name, a type, a distance, a location, etc.

Furthermore, the robot 100a may perform an operation or run by controlling the driver based on a user's control/interaction. In this case, the robot 100a may obtain intention information of interaction according to a user's behavior or voice utterance, may determine a response based on the obtained intention information, and may perform an operation.

AI and Self-Driving to which the Present Disclosure is Applicable

The AI technology is applied to the self-driving vehicle 100b, and the self-driving vehicle 100b may be implemented as a mobile robot, a vehicle, an unmanned aerial vehicle, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as the component of the self-driving vehicle 100b, but may be configured as separate hardware outside the self-driving vehicle 100b and connected to the self-driving vehicle 100b.

The self-driving vehicle 100b may obtain status information of the self-driving vehicle 100b, detect (recognize) a surrounding environment and object, generate map data, determine a moving path and a running plan, or determine an operation, using sensor information obtained from various types of sensors.

In order to determine the moving path and the running plan, the self-driving vehicle 100b may use sensor information obtained from at least one sensor among LIDAR, a radar and a camera, in the same manner as the robot 100a.

Particularly, the self-driving vehicle 100b may recognize an environment or an object in an area in which a sight is blocked or an area of a predetermined distance or more by receiving sensor information from external devices, or may receive information that is directly recognized from the external devices.

The self-driving vehicle 100b may perform the above operations using a learning model consisting of at least one artificial neural network. For example, the self-driving vehicle 100b may recognize a surrounding environment and object using a learning model and determine a running path using the recognized surrounding environment information or object information. Herein, the learning model may have been directly trained in the self-driving vehicle 100b or may have been trained in an external device such as the AI server 200.

In this instance, the self-driving vehicle 100b may directly generate results using the learning model to perform an operation, but may perform an operation by transmitting sensor information to an external device such as the AI server 200 and receiving results generated in response to this.

The self-driving vehicle 100b may determine a moving path and a running plan using at least one of map data, object information detected from sensor information, or object information obtained from an external device. The self-driving vehicle 100b may run based on the determined moving path and running plan by controlling the driver.

The map data may include object identification information for various objects disposed in the space (e.g., road) on which the self-driving vehicle 100b runs. For example, the map data may include object identification information for fixed objects, such as a streetlight, a rock, and a building, etc., and mobile objects, such as a vehicle and a pedestrian.

Furthermore, the object identification information may include a name, a type, a distance, a location, etc.

Furthermore, the self-driving vehicle 100b may perform an operation or run by controlling the driver based on a user's control/interaction. In this case, the self-driving vehicle 100b may obtain intention information of an interaction according to a user' behavior or voice speaking, may determine a response based on the obtained intention information, and may perform an operation.

AI and XR to which the Present Disclosure is Applicable

The AI technology is applied to the XR device 100c, and the XR device 100c may be implemented as a head-mount display (HMD), a head-up display (HUD) provided in a vehicle, television, a mobile phone, a smartphone, a computer, a wearable device, home appliances, a digital signage, a vehicle, a fixed robot or a mobile robot.

The XR device 100c may generate location data and attributes data for three-dimensional (3D) points by analyzing 3D point cloud data or image data obtained through various sensors or from an external device, may obtain information on a surrounding space or real object based on the generated location data and attributes data, and may output an XR object by rendering the XR object. For example, the XR device 100c may output an XR object including additional information for a recognized object by making the XR object correspond to the corresponding recognized object.

The XR device 100c may perform the above operations using a learning model consisting of at least one artificial neural network. For example, the XR device 100c may recognize a real object in 3D point cloud data or image data using a learning model, and may provide information corresponding to the recognized real object. In this case, the learning model may have been directly trained in the XR device 100c or may have been trained in an external device such as the AI server 200.

In this instance, the XR device 100c may directly generate results using a learning model and perform an operation, but may perform an operation by transmitting sensor information to an external device such as the AI server 200 and receiving results generated in response to this.

AI, Robot and Self-Driving to which the Present Disclosure is Applicable

The AI technology and the self-driving technology are applied to the robot 100a, and the robot 100a may be implemented as a guidance robot, a transport robot, a cleaning robot, a wearable robot, an entertainment robot, a pet robot, an unmanned aerial robot, etc.

The robot 100a to which the AI technology and the self-driving technology are applied may mean a robot itself having a self-driving function, or may mean the robot 100a interacting with the self-driving vehicle 100b.

The robot 100a with the self-driving function may collectively refer to devices that move by itself along a given path without control of a user or determine by itself a moving path and move.

The robot 100a with the self-driving function and the self-driving vehicle 100b may use a common sensing method to determine one or more of a moving path or a running plan. For example, the robot 100a with the self-driving function and the self-driving vehicle 100b may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or an operation associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if it is determined that a driver is in a drowsiness state, the robot 100a may activate the self-driving function of the self-driving vehicle 100b or assist control of a driving unit of the self-driving vehicle 100b. Herein, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information including signal information, etc., as in a smart traffic light, and may automatically connect an electric charger to a filling inlet through an interaction with the self-driving vehicle 100b as in the automatic electric charger of an electric vehicle.

AI, Robot and XR to which the Present Disclosure is Applicable

The AI technology and the XR technology are applied to the robot 100a, and the robot 100a may be implemented as a guidance robot, a transport robot, a cleaning robot, a wearable robot, an entertainment robot, a pet robot, an unmanned aerial robot, a drone, etc.

The robot 100a to which the XR technology is applied may mean a robot that is a target of control/interaction within an XR image. In this case, the robot 100a is different from the XR device 100c, and they may operate in conjunction with each other.

If the robot 100a that is a target of control/interaction within the XR image obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at time of the robot 100a remotely operating in conjunction through an external device such as the XR device 100c, may adjust a self-driving path of the robot 100a through an interaction, may control an operation or driving, or may identify information of a surrounding object.

AI, Self-Driving and XR to which the Present Disclosure is Applicable

The AI technology and the XR technology are applied to the self-driving vehicle 100b, and the self-driving vehicle 100b may be implemented as a mobile robot, a vehicle, an unmanned aerial vehicle, etc.

The self-driving vehicle 100b to which the XR technology is applied may mean a self-driving vehicle provided with a means for providing an XR image or a self-driving vehicle that is a target of control/interaction within the XR image. Particularly, the self-driving vehicle 100b that is the target of control/interaction within the XR image is different from the XR device 100c, and they may operate in conjunction with each other.

The self-driving vehicle 100b provided with the means for providing the XR image may obtain sensor information from sensors including a camera, and may output the XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least a part of the XR object may be output to overlap with a real object toward which a passenger's view is directed. On the other hand, when the XR object is output to a display included within the self-driving vehicle 100b, at least a part of the XR object may be output to overlap with an object within a screen. For example, the self-driving vehicle 100b may output XR objects corresponding to objects, such as a carriageway, other vehicles, a traffic light, a signpost, a two-wheeled vehicle, a pedestrian, and a building.

If the self-driving vehicle 100b that is a target of control/interaction within an XR image obtains sensor information from sensors including a camera, the self-driving vehicle 100b or the XR device 100c may create an XR image based on the sensor information, and the XR device 100c may output the created XR image. Furthermore, the self-driving vehicle 100b may operate based on a control signal received through an external device, such as the XR device 100c, or a user's interaction.

5G System Architecture to which the Present Disclosure is Applicable

A 5G system is an advanced technology from 4G LTE mobile communication technology and supports a new radio access technology (RAT), extended long term evolution (eLTE) as an extended technology of LTE, non-3GPP access (e.g., wireless local area network (WLAN) access), etc. through the evolution or a clean-state structure of an existing mobile communication network structure.

The 5G system is defined as service-based, and the interaction between network functions (NFs) in architecture for the 5G system can be represented in two ways as follows.

Reference point representation: shows the interaction between NF services in NFs described by a point-to-point reference point (e.g., N11) between two NFs (e.g., AMF and SMF).

Service-based representation: network functions (e.g., AMF) within a control plane (CP) enable other authorized network functions to access their services. This representation also includes a point-to-point reference point, if necessary.

Overview of 3GPP System

FIG. 4 illustrates various reference points.

In an example of a network structure illustrated in FIG. 4, the SGW and the PDN GW are configured as separate gateways, but the two gateways may be implemented according to a single gateway configuration option.

The MME is an element to perform signaling and control functions for supporting access to the network connection of the UE, allocation, tracking, paging, roaming, and handover of network resources, and so on. The MME controls control plane functions related to subscribers and session management. The MME manages a large number of eNBs and performs signaling of the conventional gateway selection for handover to other 2G/3G networks. Further, the MME performs functions of security procedures, terminal-to-network session handling, idle terminal location management, etc.

The SGSN handles all packet data such as mobility management and authentication of the user for another 3GPP network (e.g., GPRS network).

The ePDG serves as a security node for an untrusted non-3GPP network (e.g., I-WLAN, WiFi hotspot, etc.).

As described with reference to FIG. 4, the UE with IP capability can access the IP service network (e.g., IMS) provided by a service provider (i.e., operator) via various components within the EPC based on the non-3GPP access as well as the 3GPP access.

For example, reference points such as S1-U and S1-MME can connect two functions present in different functional entities. The 3GPP system defines a conceptual link connecting two functions present in different functional entities of E-UTRAN and EPC, as a reference point. The following Table 1 summarizes reference points illustrated in FIG. 4. In addition to the example of Table 1, various reference points can exist depending on the network structure.

X2 user plane (X2-U) interface is defined between the eNBs. The X2-U interface provides non-guaranteed delivery of a user plane packet data unit (PDU). X2 control plane (X2-CP) interface is defined between two neighboring eNBs. The X2-CP performs functions of context delivery between the eNBs, control of user plane tunnel between a source eNB and a target eNB, delivery of handover-related messages, uplink load management, and the like.

The eNB is connected to the UE via a radio interface and is connected to an evolved packet core (EPC) by means of the S1 interface.

S1 user plane (S1-U) interface is defined between the eNB and a serving gateway (S-GW). S1 control plane interface (S1-MME) is defined between the eNB and a mobility management entity (MME). The S1 interface performs functions of evolved packet system (EPS) bearer service management, non-access stratum (NAS) signaling transport, network sharing, MME load balancing, and so on. The S1 interface supports many-to-many-relation between the eNB and the MME/S-GW.

The MME can perform various functions such as NAS signaling security, access stratum (AS) security control, inter-core network (CN) node signaling for supporting mobility between 3GPP access networks, idle mode UE

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 4, S2a and S2b correspond to non-3GPP interfaces. S2a is a reference point to provide a user plane with related control and mobility support between the trusted non-3GPP access and the PDN GW. S2b is a reference point to provide a user plane with related control and mobility support between the ePDG and the PDN GW.

FIG. 5 illustrates an example of a network structure of an evolved universal terrestrial radio access network (E-UTRAN) to which the present disclosure is applicable.

An E-UTRAN system is an evolved version of the existing UTRAN system and may be, for example, 3GPP LTE/ LTE-A system. Communication networks are widely deployed to provide various communication services such as voice (e.g., voice over Internet protocol (VoIP)) through IMS and packet data.

Referring to FIG. 5, an E-UMTS network includes an E-UTRAN, an EPC, and one or more UEs. The E-UTRAN consists of eNBs that provide control plane and user plane protocols to the UE, and the eNBs are interconnected with each other by means of the X2 interface.

reachability (including control and execution of paging retransmission), tracking area identity (TAI) management (for UE in idle and active modes), PDN GW and SGW selection, MME selection for handover with MME change, SGSN selection for handover to 2G or 3G 3GPP access networks, roaming, authentication, bearer management functions including dedicated bearer establishment, support of public warning system (PWS) (including earthquake and tsunami warning system (ETWS) and commercial mobile alert system (CMAS)) message transmission, and the like.

FIG. 6 illustrates an example of a general architecture of E-UTRAN and EPC.

As illustrated in FIG. 6, the eNB can perform functions such as routing to gateway while radio resource control (RRC) connection is activated, scheduling and transmission of paging messages, scheduling and transmission of a broadcast channel (BCH), dynamic allocation of resources in uplink and downlink to the UE, configuration and provision for the measurement of the eNB, radio bearer control, radio admission control, and connection mobility control. The eNB can perform functions such as paging generation in the EPC, management of an LTE_IDLE state, ciphering of a user plane, SAE bearer control, and ciphering and integrity protection of NAS signaling.

Annex J of 3GPP TR 23.799 shows various architectures by combining 5G and 4G. An architecture using NR and NGC is disclosed in 3GPP TS 23.501.

FIG. 7 illustrates an example of a structure of a radio interface protocol in a control plane between a UE and eNB. FIG. 8 illustrates an example of a structure of a radio interface protocol in a user plane between a UE and eNB.

The radio interface protocol is based on 3GPP radio access network standard. The radio interface protocol horizontally consists of a physical layer, a data link layer, and a network layer, and is vertically divided into a user plane for data information transmission and a control plane for control signaling delivery.

The protocol layers may be divided into L1 (first layer), L2 (second layer), and L3 (third layer) based upon three lower layers of an open system interconnection (OSI) standard model that is well known in the art of communication systems.

The layers of the radio protocol in the control plane illustrated in FIG. 7 and the layers of the radio protocol in the user plane illustrated in FIG. 8 are described below.

The physical layer, the first layer, provides an information transfer service using a physical channel. The physical layer is connected with a medium access control (MAC) layer located at a higher level via a transport channel, and data between the MAC layer and the physical layer is transferred via the transport channel. Data is transferred between different physical layers, i.e., between physical layers of a transmission side and a reception side via the physical channel.

The physical channel consists of several subframes on a time axis and several subcarriers on a frequency axis. Here, one subframe consists of a plurality of OFDM symbols and a plurality of subcarriers on the time axis. One subframe consists of a plurality of resource blocks, and one resource block consists of a plurality of OFDM symbols and a plurality of subcarriers. A unit time, a transmission time interval (TTI), at which data is transmitted is 1 ms corresponding to one subframe.

Physical channels existing in the physical layers of the transmission side and the reception side may be divided into a physical downlink shared channel (PDSCH) and a physical uplink shared channel (PUSCH) that are data channels, and a physical downlink control channel (PDCCH), a physical control format indicator channel (PCFICH), a physical hybrid-ARQ indicator channel (PHICH), and a physical uplink control channel (PUCCH) that are control channels, according to 3GPP LTE.

There are several layers in the second layer. A medium access control (MAC) layer of the second layer functions to map various logical channels to various transfer channels, and also performs a function of logical channel multiplexing for mapping several logical channels to one transfer channel. The MAC layer is connected to a radio link control (RLC) layer, that is an upper layer, via the logical channel. The logical channel is roughly divided into a control channel used to transmit information of the control plane and a traffic channel used to transmit information of the user plane according to a type of transmitted information.

The MAC layer of the second layer segments and concatenate data received from the upper layer and adjusts a data size so that a lower layer is adapted to transmit data to a radio section.

A packet data convergence protocol (PDCP) layer of the second layer performs a header compression function of reducing an IP packet header size that has a relatively large size and contains unnecessary control information, in order to efficiently transmit data in a radio section having a small bandwidth upon transmission of IP packet such as IPv4 or IPv6. In the LTE system, the PDCP layer also performs a security function, which consists of ciphering for preventing data interception by a third party and integrity protection for preventing data manipulation by a third party.

A radio resource control (RRC) layer located at the uppermost part of the third layer is defined only in the control plane and is responsible for controlling logical channels, transport channels, and physical channels in relation to configuration, re-configuration, and release of radio bearers (RBs). The RB means services provided by the second layer to ensure data transfer between the UE and the E-UTRAN.

If an RRC connection is established between an RRC layer of the UE and an RRC layer of a wireless network, the UE is in an RRC connected mode. Otherwise, the UE is in an RRC idle mode.

An RRC state of the UE and an RRC connection method are described below. The RRC state refers to a state in which the RRC of the UE is or is not logically connected with the RRC of the E-UTRAN. The RRC state of the UE having logical connection with the RRC of the E-UTRAN is referred to as an RRC_CONNECTED state, and the RRC state of the UE not having logical connection with the RRC of the E-UTRAN is referred to as an RRC_IDLE state. Since the UE in the RRC_CONNECTED state has the RRC connection, the E-UTRAN can identify the presence of the corresponding UE on a per cell basis and thus efficiently control the UE. On the other hand, the E-UTRAN cannot identify the presence of the UE of the RRC_IDLE state, and the UE in the RRC_IDLE state is managed by a core network based on a tracking area (TA) which is an area unit larger than the cell. That is, for the UE in the RRC_IDLE state, only presence or absence of the corresponding UE is identified in an area unit larger than the cell. In order for the UE of the RRC_IDLE state to receive typical mobile communication services such as voice and data, the UE should transition to the RRC_CONNECTED state. Each TA is distinguished from another TA by a tracking area identity (TAI) thereof. The UE may configure the TAI through a tracking area code (TAC) which is information broadcasted from a cell.

When the user initially turns on the UE, the UE first searches for a proper cell, and then establishes RRC connection in the corresponding cell and registers information of the UE in the core network. Thereafter, the UE stays in the RRC_IDLE state. The UE staying in the RRC_IDLE state (re)selects a cell and checks system information or paging information, if necessary. This operation is called camping on a cell. Only when the UE staying in the RRC_IDLE state needs to establish the RRC connection, the UE establishes the RRC connection with the RRC layer of the E-UTRAN through a RRC connection procedure and transitions to the RRC_CONNECTED state. There are several cases where the UE remaining in the RRC_IDLE state needs to establish the RRC connection. For example, the cases may include an attempt of a user to make a phone call, an attempt to transmit data, or transmission of a response message when receiving a paging message from the E-UTRAN.

A non-access stratum (NAS) layer positioned over the RRC layer performs functions such as session management and mobility management.

The NAS layer illustrated in FIG. 7 is described in detail below.

The evolved session management (ESM) belonging to the NAS layer performs functions such as default bearer management and dedicated bearer management, and is responsible for controlling the UE to use a PS service from a network. The default bearer resources are allocated from a network when they are accessed to the network upon first access to a specific packet data network (PDN). In this instance, the network allocates an IP address available for the UE so that the UE can use a data service, and also allocates QoS of a default bearer. LTE roughly supports two types of bearers including a bearer with guaranteed bit rate (GBR) QoS characteristics for guaranteeing a specific bandwidth for data transmission/reception and a non-GBR bearer with best effort QoS characteristics without guaranteeing a bandwidth. The default bearer is allocated the non-GBR bearer. The dedicated bearer may be allocated a bearer with GBR or non-GBR QoS characteristics.

A bearer that the network allocates to the UE is referred to as an evolved packet service (EPS) bearer. When the network allocates the EPS bearer to the UE, the network assigns one ID. This ID is called an EPS bearer ID. One EPS bearer has QoS characteristics of a maximum bit rate (MBR) and/or a guaranteed bit rate (GBR).

FIG. 9 illustrates a general architecture of NR-RAN.

Referring to FIG. 9, the NR-RAN node may be one of the followings.

gNB providing NR user plane and control plane protocols towards the UE; or ng-eNB providing E-UTRA user plane and control plane protocols towards the UE.

The gNB and the ng-eNB are interconnected with each other by means of the Xn interface. The gNB and ng-eNB are also interconnected with the access and mobility management function (AMF) by means of the NG interface to SGC, more specifically, by means of the NG-C interface, and are interconnected with the user plane function (UPF) by means of the NG-U interface (see 3GPP TS 23.501 [3]).

For reference, architecture and F1 interface for functional split are defined in 3GPP TS 38.401 [4].

FIG. 10 illustrates an example of general functional split between NG-RAN and SGC.

Referring to FIG. 10, yellow boxes depict logical nodes, and white boxes depict main functions.

The gNB and ng-eNB host the following functions.

Functions for Radio Resource Management: radio bearer control, radio admission control, connection mobility control, and dynamic allocation of resources to UEs in both uplink and downlink (scheduling);
IP header compression, encryption and integrity protection of data;
Selection of an AMF at IMT-2000 3GPP-UE attachment when no routing to an AMF can be determined from the information provided by the UE;
Routing of user plane data towards UPF(s);
Routing of control plane information towards AMF;
Connection setup and release;
Scheduling and transmission of paging messages;
Scheduling and transmission of system broadcast information (originated from the AMF or OAM);
Measurement and measurement reporting configuration for mobility and scheduling;
Transport level packet marking in the uplink;
Session management;
Support of network slicing;
QoS flow management and mapping to data radio bearers;
Support of UEs in RRC_INACTIVE state;
Distribution function for NAS messages;
Radio access network sharing;
Dual connectivity;
Tight interworking between NR and E-UTRA.

The AMF hosts the following main functions (see 3GPP TS 23.501 [3]).

NAS signalling termination;
NAS signalling security;
AS security control;
Inter CN node signalling for mobility between 3GPP access networks;
Idle mode UE reachability (including control and execution of paging retransmission);
Registration area management;
Support of intra-system and inter-system mobility;
Access authentication;
Access authorization including check of roaming rights;
Mobility management control (subscription and policies);
Support of network slicing;
SMF selection.

The UPF hosts the following main functions (see 3GPP TS 23.501 [3]).

Anchor point for intra-/inter-RAT mobility (when applicable);
External PDU session point of interconnect to data network;
Packet routing and forwarding;
Packet inspection and user plane part of policy rule enforcement;
Traffic usage reporting;
Uplink classifier to support routing traffic flows to a data network;
Branching point to support multi-homed PDU session;
QoS handling for user plane (e.g., packet filtering, gating, UL/DL rate enforcement);
Uplink traffic verification (SDF to QoS flow mapping);
Downlink packet buffering and downlink data notification triggering.

The session management function (SMF) hosts the following main functions (see 3GPP TS 23.501 [3]).

Session management;
UE IP address allocation and management;
Selection and control of UP function;
Configure traffic steering at UPF to route traffic to proper destination;
Control part of policy enforcement and QoS;
Downlink data notification.

FIG. 11 illustrates an example of a general architecture of 5G.

The following is given a description for each reference interface and each node illustrated in FIG. 11.

An access and mobility management function (AMF) supports functions of inter-CN node signaling for mobility between 3GPP access networks, termination of radio access network (RAN) CP interface (N2), termination of NAS signaling (N1), registration management (registration area management), idle mode UE reachability, support of network slicing, SMF selection, and the like.

Some or all of the functions of the AMF can be supported in a single instance of one AMF.

A data network (DN) means, for example, operator services, internet access, or 3rd party service, etc. The DN transmits a downlink protocol data unit (PDU) to the UPF or receives the PDU transmitted from the UE from the UPF.

A policy control function (PCF) receives information about packet flow from an application server and provides functions of determining policies such as mobility management and session management.

A session management function (SMF) provides a session management function. If the UE has a plurality of sessions, the sessions can be respectively managed by different SMFs.

Some or all of the functions of the SMF can be supported in a single instance of one SMF.

A unified data management (UDM) stores subscription data of user, policy data, etc.

A user plane function (UPF) transmits the downlink PDU received from the DN to the UE via the (R)AN and transmits the uplink PDU received from the UE to the DN via the (R)AN.

An application function (AF) interacts with 3GPP core network to provide services (e.g., to support functions of an application influence on traffic routing, network capability exposure access, interaction with policy framework for policy control, and the like).

A (radio) access network (R)AN collectively refers to a new radio access network supporting both evolved E-UTRA, that is an evolved version of 4G radio access technology, and a new radio (NR) access technology (e.g., gNB).

The gNB supports functions for radio resource management (i.e., radio bearer control, radio admission control, connection mobility control, and dynamic allocation of resources to UEs in uplink/downlink (i.e., scheduling)).

The UE means a user equipment.

In the 3GPP system, a conceptual link connecting between the NFs in the 5G system is defined as a reference point.

N1 is a reference point between the UE and the AMF, N2 is a reference point between the (R)AN and the AMF, N3 is a reference point between the (R)AN and the UPF, N4 is a reference point between the SMF and the UPF, N6 is a reference point between the UPF and the data network, N9 is a reference point between two core UPFs, N5 is a reference point between the PCF and the AF, N7 is a reference point between the SMF and the PCF, N24 is a reference point between the PCF in the visited network and the PCF in the home network, N8 is a reference point between the UDM and the AMF, N10 is a reference point between the UDM and the SMF, N11 is a reference point between the AMF and the SMF, N12 is a reference point between the AMF and an authentication server function (AUSF), N13 is a reference point between the UDM and the AUSF, N14 is a reference point between two AMFs, N15 is a reference point between the PCF and the AMF in case of non-roaming scenario and a reference point between the PCF in the visited network and the AMF in case of roaming scenario, N16 is a reference point between two SMFs (reference point between the SMF in the visited network and the SMF in the home network in case of roaming scenario), N17 is a reference point between AMF and 5G-equipment identity register (EIR), N18 is a reference point between the AMF and an unstructured data storage function (UDSF), N22 is a reference point between the AMF and a network slice selection function (NSSF), N23 is a reference point between the PCF and a network data analytics function (NWDAF), N24 is a reference point between the NSSF and the NWDAF, N27 is a reference point between a network repository function (NRF) in the visited network and the NRF in the home network, N31 is a reference point between NSSF in the visited network and NSSF in the home network, N32 is a reference point between security protection proxy (SEPP) in the visited network and SEPP in the home network, N33 is a reference point between a network exposure function (NEF) and the AF, N40 is a reference point between the SMF and a charging function (CHF), and N50 is a reference point between the AMF and a circuit bearer control function (CBCF).

FIG. 11 illustrates a reference model where the UE accesses to one DN using one PDU session, by way of example, for convenience of explanation, but the present invention is not limited thereto.

The following has been described based on the EPS system using the eNB for convenience of explanation. However, the EPS system may be replaced with the 5G system by replacing the eNB by the gNB, the mobility management (MM) function of the MME by the AMF, the SM function of S/P-GW by the SMF, and the user plane-related function of the S/P-GW by the UPF.

In the above, the present disclosure has been described based on the EPS, but the corresponding content can be supported by going through similar operations through processes/messages/information for similar purpose in the 5G system.

PLMN Selection Procedure

The following Table 2 is content related to a PLMN selection defined in 3GPP TS 22.011.

TABLE 2

The UE shall select and attempt registration on other PLMNs, if available and allowable, if the location area is not in the list of "forbidden LAs for roaming" and the tracking area is not in the list of "forbidden TAs for roaming" (see 3GPP TS 23.122 [3]), in the following order:
i) An EHPLMN if the EHPLMN list is present or the HPLMN (derived from the IMSI) if the EHPLMN list is not present for preferred access technologies in the order specified. In the case that there are multiple EHPLMNs present then the highest priority EHPLMN shall be selected. It shall be possible to configure a voice capable UE so that it shall not attempt registration on a PLMN if all cells identified as belonging to the PLMN do not support the corresponding voice service.
ii) Each entry in the "User Controlled PLMN Selector with Access Technology" data field in the SIM/USIM (in priority order). It shall be possible to configure a voice capable UE so that it shall not attempt registration on a PLMN if all cells identified as belonging to the PLMN do not support the corresponding voice service.
iii) Each entry in the "Operator Controlled PLMN Selector with Access Technology" data field in the SIM/USIM (in priority order). It shall be possible to configure a voice capable UE so that it shall not attempt registration on a PLMN if all cells identified as belonging to the PLMN do not support the corresponding voice service.
iv) Other PLMN/access technology combinations with sufficient received signal quality (see 3GPP TS 23.122 [3]) in random order. It shall be possible to configure a voice capable UE so that it shall not attempt registration on a PLMN if all cells identified as belonging to the PLMN do not support the corresponding voice service.

TABLE 2-continued v) All other PLMN/access technology combinations in order of decreasing signal quality. It shall be possible to configure a voice capable UE so that it shall not attempt registration on a PLMN if all cells identified as belonging to the PLMN do not support the corresponding voice service.
In the case of a UE operating in UE operation mode A or B, an allowable PLMN is one which is not in the "Forbidden PLMN" data field in the SIM/USIM. This data field may be extended in the ME memory (see clause 3.2.2.4). In the case of a UE operating in UE operation mode C, an allowable PLMN is one which is not in the "Forbidden PLMN" data field in the SIM/USIM or in the list of "forbidden PLMNs for GPRS service" in the ME.
If successful registration is achieved, the UE shall indicate the selected PLMN.

Roaming Steering

The following Table 3 represents a method of affecting the PLMN selection in relation to the registration, and is described in TS 22.011.

TABLE 3

Steering to a specific VPLMN

It shall be possible for the HPLMN at any time to direct a UE, that is in automatic mode, to search for a specific VPLMN and, if it is available, move to that VPLMN as soon as possible. This VPLMN shall then be regarded as the highest priority VPLMN as defined by the operator, though any EHPLMN or PLMN on the User Controlled PLMN list shall have higher priority. This process shall be done transparently and without inconvenience to the user.
If the UE is in manual mode, the steering request shall be ignored.
If the UE is registered on a VPLMN that is present on the User Controlled PLMN List, the steering request shall be ignored. PLMNs contained on the User Controlled PLMN List shall have priority over the steered-to-PLMN.
The UE shall attempt to register on the specified VPLMN even if the specified VPLMN is present on a Forbidden List.
This mechanism shall be available to the HPLMN even if the VPLMN the UE is registered on is compliant to an earlier release of the 3GPP specifications.

VPLMN Redirection

It shall be possible for the HPLMN to request a UE, that is in automatic mode, to find and register on a different VPLMN from the one it is currently using or trying to register on, if another VPLMN, that is not in a Forbidden List, is available. The original VPLMN shall then be treated as the lowest priority VPLMN and would not be selected by the UE unless it is the only one available to the UE or has been selected in manual mode. This process shall be done transparently and without inconvenience to the user.
If the UE is in manual mode, the redirection request shall be ignored.
If the UE is registered on a VPLMN that is present on the User Controlled PLMN List, the redirection request shall be ignored.
This mechanism shall be available to the HPLMN even if the VPLMN the UE is registered on is compliant to an earlier release of the 3GPP specifications.

Embodiments of the Present Disclosure

As the mobile communication services have become an indispensable service in daily life, each mobile service provider is making various attempts to prevent interruption of services. For example, the mobile service providers use a plurality of wired networks in a core network duration in a wireless network or install a plurality of core networks such as AMFs/MMEs, and thus can prevent interruption of communication services by performing backup in other network node even if there is a problem in one network node.

However, in the event of a disaster such as a fire or an earthquake, the above measures may not be helpful. For example, this is because, in the event of a fire, all communication cables connected to the outside from one node of the wireless network may be lost. For example, in a virtualized cloud environment, the plurality of core networks such as AMFs/MMEs are highly likely to be implemented in one data center located in the same area. In addition, if the data center is located at a central point of the earthquake, there is a high possibility that all functions will be lost no matter how the plurality of AMFs/MMEs are implemented.

Accordingly, the most efficient way is to think of roaming. That is, if the UE cannot receive communication service since there is a problem in a network of a mobile service provider to which the UE subscribes, the UE can roam to other surrounding mobile service provider and receive communication service. Each mobile service provider installs wireless networks and core networks in its licensed area, installs them in a different building, and builds networks in a different way. Hence, the disasters listed as examples in the preceding description may not have the same impact on all the mobile service providers.

Each mobile service provider actively installs wireless networks and core networks in an area where he/she obtained a license from an actual legal institution and obtained a business right. However, the provider cannot install the wireless/core networks in other areas because there is no business right. For example, if any UE leaves an area or a country to which it subscribes, the UE receives a roaming service over a network of other service providers. However, if the UE is located in the area or country to which it subscribes, the UE cannot receive the roaming service in the area due to a relationship between the mobile service providers competing with each other.

In particular, in the case of a roaming service in an overseas area, when the UE is turned on in a new area, the UE automatically activates the roaming service since the UE cannot discover the network of the mobile service provider to which the UE subscribes. However, if the UE is located in an area where its provider mainly conducts business, the UE does not activate the roaming service and thus cannot receive the roaming service in the disaster situation as described above.

In particular, depending on the reason why the mobile service provider, to which the UE subscribes, cannot provide the communication services, a service interruption time for which actual service is not provided to the UE may vary variously. For example, when the power supply to a wireless network is interrupted, the wireless network does not generate any radio waves. Therefore, the UE can recognize a problem of its subscribed network by detecting a radio wave reception failure. However, if wired communication lines of a wireless network and a core network are cut off, the wireless network still generates radio waves. Therefore, it is highly likely that the UE will recognize that the communication network is still alive and will not take any action. If someone attempts to make a call to the UE, the UE may not recognize it.

Accordingly, the present disclosure provides a method, in which when any UE cannot receive communication services from a communication network since a problem occurs in the communication network connected to the UE, interruption of communication services is minimized by efficiently moving the UE to other communication network.

To this end, first, in the present disclosure, in order to allow a UE to rapidly recognize a problem of communication service, if a wireless network cannot smoothly provide communication services to UEs within an area managed by the wireless network, the wireless network can inform the UE of it.

Through this, after the UE is informed that the UE cannot receive the communication services from a communication network to which the UE itself currently accesses or registers, the UE newly performs a PLMN selection procedure to select other communication network not the currently registered network, and performs a registration process with respect to the selected communication network.

FIG. 12 is a flow chart illustrating an example of selecting a PLMN according to an embodiment of the present disclosure.

As illustrated in FIG. 12, a UE 1210 may perform a registration to a first PLMN (CN 1) 1213 via a first base station (RAN 1) 1211, in 51201.

For example, the UE may find a HPLMN, to which the UE is subscribed, and select its PLMN to perform a registration process. Afterwards, the UE may be placed in an idle mode and placed in a connected mode based on an activation state of a traffic.

Subsequently, the first base station may transmit a heartbeat protocol to the first PLMN, in S1203.

Next, the first base station may detect a failure of the first PLMN, in S1205.

For example, the first base station may find a problem in a first system including the first base station and the first PLMN. The first base station may recognize that the first system cannot provide communication services to the UE (user).

Specifically, the first base station may inform the UE about whether there is a failure of the first PLMN, S1207.

For example, the first base station may send a message, which informs that the first system cannot normally provide services to the UEs (users), to the UEs receiving services from the first system. Here, the UE may recognize, based on the message received from the first base station, that the UE cannot receive normally the communication services from the first PLMN to which the UE is registered, and may perform the PLMN selection procedure.

Subsequently, the UE may select a new PLMN and perform the camping and/or registration process on the selected second PLMN, in 51209.

Method 1

In the process illustrated in FIG. 12, a method for the first base station (first wireless network) to recognize a failure problem of the first PLMN (first core network) may use PFCP HearBeat protocol, etc. specified in the standard document TS 23.527. That is, the first base station (e.g., gNB or eNB) periodically exchanges a packet with UPF/AMF/MME/S-GW, etc. that have been connected to the first base station, and decides that a problem has occurred in the first PLMN (first core network) when there is no packet that has been exchanged for a predetermined time.

Method 2

A plurality of UEs may be present/connected in a cell in which one base station is included, and the respective UEs are placed in various states including RRC Connected, RRC Connected inactive, RRC Idle, etc. depending on each data generation state or voice call progress state, etc. Based on the UE's state, the UE may immediately exchange information with the base station, and exchange information with the base station at a specific time. If the base station, i.e., the wireless network recognizes a problem occurring in the core wireless network (PLMN), it is important that the base station quickly informs the UE of the problem, while at the same time transmitting this information most efficiently.

Method 2-1

As a method for the first base station (wireless network) to efficiently inform each UE of a problem in a current communication network and allow each UE to move to another network, a system information block (SIB) may be used.

If the connection between the first base station and the first PLMN is released, MBMS method cannot be used since the first base station cannot produce contents of MBMS. In this case, the first base station (wireless network) may perform an operation such as paging to inform the UE of an update of SIB information, and then may inform the UE of the problem occurring in the first PLMN via the SIB information or indicate to the UE the movement to another PLMN.

FIG. 13 is a flow chart illustrating a PLMN selection procedure according to method 2-1.

As illustrated in FIG. 13, a first base station may detect a failure of a first PLMN, in S1301.

The first base station may send an SIB update notification message to a UE, in 51303.

The UE may check (monitor) whether there is paging information (or message) that the UE shall receive during a predetermined reception duration (time duration configured to attempt reception from the first base station), in 51305. If the paging information to be received is not monitored, the UE may maintain the existing operation.

Subsequently, if the first base station detects the failure of the first PLMN and cannot provide communication services to the UE, and thus the UE needs to move to other system, the first base station may inform the UE of it through an updated SIB message, in 51307.

The UE may receive (monitor) the SIB according to a predetermined SIB transmission periodicity, S1309.

The UE may determine a switch to other PLMN (network) as indicated in the SIB message, S1311.

Subsequently, the UE may select a new PLMN (network) and request camping and/or registration to the selected new PLMN (core network 2), in S1313.

For example, the SIB may contain the following content.

SIB1 contains information relevant when evaluating if a UE is allowed to access a cell, and defines the scheduling of other system information. It also contains radio resource configuration information that is common for all UEs and barring information applied to the unified access control.

The content of a SIB1 message is as follows.
Signalling radio bearer: N/A
RLC-SAP: TM
Logical channel: BCCH
Direction: Network to UE
Table 4 is an example of the SIB1 message.

TABLE 4

```
-- ASN1START
-- TAG-SIB1-START
SIB1 ::=            SEQUENCE {
    cellSelectionInfo                           SEQUENCE {
        q-RxLevMin                                  Q-RxLevMin,
        q-RxLevMinOffset                            INTEGER           (1 .. 8)
OPTIONAL,   -- Need R
        q-RxLevMinSUL                                               Q-RxLevMin
OPTIONAL,   -- Need R
        q-QualMin                                                    Q-QualMin
OPTIONAL,   -- Need R
        q-QualMinOffset                             INTEGER           (1 .. 8)
OPTIONAL    -- Need R
    }
OPTIONAL,   -- Need S
    cellAccessRelatedInfo                       CellAccessRelatedInfo,
    connEstFailureControl                                 ConnEstFailureControl
OPTIONAL,   -- Need R
    si-SchedulingInfo                                          SI-SchedulingInfo
OPTIONAL,   -- Need R
    servingCellConfigCommon                          ServingCellConfigCommonSIB
OPTIONAL,   -- Need R
    ims-Emergency Support                             ENUMERATED    {true}
OPTIONAL,   -- Need R
    eCallOverIMS-Support                              ENUMERATED    {true}
OPTIONAL,   -- Cond Absent
    ue-Timers AndConstants                              UE-Timers AndConstants
OPTIONAL,   -- Need R
    uac-BarringInfo                             SEQUENCE {
        uac-BarringForCommon                                  UAC-BarringPerCatList
OPTIONAL,   -- Need S
        uac-BarringPerPLMN-List                              UAC-BarringPerPLMN-List
OPTIONAL,   -- Need S
        uac-BarringInfoSetList                  UAC-BarringInfoSetList,
        uac-AccessCategory 1-Selection AssistanceInfo CHOICE {
            plmnCommon                                        UAC-AccessCategory 1-
SelectionAssistanceInfo,
            individualPLMNList                                SEQUENCE (SIZE
(2 .. maxPLMN)) OF UAC-AccessCategory 1-SelectionAssistanceInfo
        }
OPTIONAL
    }
OPTIONAL,   -- Need R
    useFullResumeID                                   ENUMERATED    {true}
OPTIONAL,   -- Need N
SelectOtherPLMN                                                 Boolean
    lateNonCriticalExtension                              OCTET   STRING
OPTIONAL,
    nonCriticalExtension                                       SEQUENCE{ }
OPTIONAL
}
UAC-AccessCategory 1-Selection AssistanceInfo ::=       ENUMERATED {a, b, c}
-- TAG-SIB1-STOP
-- ASN1STOP
```

Table 5 is an example of SIB1 field descriptions.

TABLE 5

| SIB1 field descriptions |
|---|
| q-QualMin<br>Parameter "$Q_{qualmin}$" in TS 38.304 [20], applicable for serving cell. If the field is not present, the UE applies the (default) value of negative infinity for $Q_{qualmin}$.<br>q-QualMinOffset<br>Parameter "$Q_{qualminoffset}$" in TS 38.304 [20]. Actual value $Q_{qualminoffset}$ = field value [dB]. If cellSelectionInfo is not present or the field is not present, the UE applies the (default) value of 0 dB for $Q_{qualminoffset}$. Affects the minimum required quality level in the cell.<br>q-RxLevMin |

TABLE 5-continued

SIB1 field descriptions

Parameter "$Q_{rxlevmin}$" in TS 38.304 [20], applicable for serving cell.
q-RxLevMinOffset
Parameter "$Q_{rxlevminoffset}$" in TS 38.304 [20]. Actual value $Q_{rxlevminoffset}$ = field value * 2 [dB].
If absent, the UE applies the (default) value of 0 dB for $Q_{rxlevminoffset}$. Affects the minimum
required Rx level in the cell.
q-RxLevMinSUL
Parameter "$Q_{rxlevminSUL}$" in TS 38.304 [4], applicable for serving cell
uac-BarringForCommon
Common access control parameters for each access category. Common values are used for
all PLMNs, unless overwritten by the PLMN specific configuration provided in uac-
BarringPerPLMN-List. The parameters are specified by providing an index to the set of
configurations (uac-BarringInfoSetList). UE behaviour upon absence of this field is
specified in section 5.3.14.2.
useFullResumeID
Indicates which resume identifier and Resume request message should be used. UE uses
full I-RNTI and RRCResumeRequest1 if the field is present, or short I-RNTI and
RRCResumeRequest if the field is absent.
uac-AccessCategory 1-SelectionAssistanceInfo
Information used to determine whether Access Category 1 applies to the UE, as defined in
[25]. A UE compliant with this version of the specification shall ignore this field.
selectotherPLMN
Indicates whether the UE should select other PLMN. This information can further include
PLMN ID of candidate PLMN.

Table 6 represents an explanation of SIB1 field.

TABLE 6

| Conditional Presence | Explanation |
| --- | --- |
| Absent | The field is not used in this version of the specification, if received, the UE shall ignore. |

That is, the wireless network may transmit, to the UE, information such as SelectOtherPLMN or information of similar purpose or name, and may allow the UEs to select other PLMN not a current PLMN. If information such as the SelectOtherPLMN contains the meaning of 'yes' or 'true', the UE may select other PLMN except the currently selected PLMN and attempt the registration.

The SelectOtherPLMN information may selectively include a target PLMN ID. That is, if pre-designated information exists in the wireless network, the wireless network may send the UE a message related to whether there is any available surrounding PLMN.

Using this, the UE may first perform selection and registration to the PLMN included therein.

Alternatively, the message may be expressed in various ways, and may also be included in other messages, for example, MIB or other information elements. For example, this is the same as the following Table 5.

MIB

The MIB includes the system information transmitted on BCH.

Signalling radio bearer: N/A
RLC-SAP: TM
Logical channel: BCCH
Direction: Network to UE Table 7 is an example of MI message.

TABLE 7

```
MIB
-- ASN1START
-- TAG-MIB-START
MIB ::=                        SEQUENCE {
    systemFrameNumber              BIT STRING (SIZE (6)),
    subCarrierSpacingCommon        ENUMERATED {scs15or60, scs30or120},
    ssb-SubcarrierOffset        INTEGER (0..15),
    dmrs-TypeA-Position            ENUMERATED {pos2, pos3},
    pdcch-ConfigSIB1               PDCCH-ConfigSIB1,
    cellBarred                     ENUMERATED {barred, notBarred},
    intraFreqReselection        ENUMERATED {allowed, notAllowed},
    spare                          BIT STRING (SIZE (1))
    SelectOtherPLMN
}
-- TAG-MIB-STOP
-- ASN1STOP
```

Table 8 is an example of MIB field descriptions.

TABLE 8

MIB field descriptions cellBarred
Barred means the cell is barred, as defined in TS 38.304 [20].
dmrs-TypeA-Position
Position of (first) DM-RS for downlink (see 38.211, section 7.4.1.1.1) and uplink (see
38.211, section 6.4.1.1.3).
intraFreqReselection
Controls cell selection/reselection to intra-frequency cells when the highest ranked cell is
barred, or treated as barred by the UE, as specified in TS 38.304 [20].
pdcch-ConfigSIB1
See TS 38.213 [13]. Determines a common ControlResourceSet (CORESET) a common
search space and necessary PDCCH parameters. If the field ssb-SubcarrierOffset indicates
that SIB1 is not present, the field pdcch-ConfigSIB1 indicate the frequency positions where
the UE may find SS/PBCH block with SIB1 or the frequency range where the network does
not provide SS/PBCH block with SIB1.
ssb-SubcarrierOffset
Corresponds to $k_{SSB}$ (see TS 38.213 [13]), which is the frequency domain offset between
SSB and the overall resource block grid in number of subcarriers. (See TS 38.211).
The value range of this field may be extended by an additional most significant bit encoded
within PBCH as specified in TS 38.213 [13].
This field may indicate that this beam does not provide SIB1 and that there is hence no
common CORESET. In this case, the field pdcch-ConfigSIB1 may indicate the frequency
positions where the UE may (not) find a SS/PBCH with a control resource set and search
space for SIB1 (see TS 38.213 [13], section 13).
subCarrierSpacingCommon
Subcarrier spacing for SIB1, Msg.2/4 for initial access and broadcast SI-messages. If the UE
acquires this MIB on a carrier frequency < 6 GHz, the value scs15or60 corresponds to 15 Khz
and the value scs30or120 corresponds to 30 KHz. If the UE acquires this MIB on a carrier
frequency > 6 GHz, the value scs15or60 corresponds to 60 Khz and the value scs30or120
corresponds to 120 kHz.
systemFrameNumber
The 6 most significant bit (MSB) of the 10-bit System Frame Number. The 4 LSB of the SFN
are conveyed in the PBCH transport block as part of channel coding (i.e. outside the MIB
encoding).

Method 2-1

A method of informing a problem of a current network via SIB or MIB, etc. as above can be applied to a UE that is in an idle mode or an RRC inactive mode. However, a base station may also indicate a UE in an RRC Connected mode to move more rapidly to another PLMN using information such as RRC Release.

RRCRelease

The RRCRelease message is used to command the release of an RRC connection or the suspension of the RRC connection.
Signalling radio bearer: SRB1
RLC-SAP: AM
Logical channel: DCCH
Direction: Network to UE
The RRCRelease message is the same as the following Table 9.

TABLE 9

```
-- ASN1START
-- TAG-RRCRELEASE-START
RRCRelease ::=                           SEQUENCE {
    rrc-TransactionIdentifier            RRC-TransactionIdentifier,
    criticalExtensions                   CHOICE {
        rrcRelease                               RRCRelease-IEs,
        criticalExtensionsFuture                 SEQUENCE { }
    }
}
RRCRelease-IEs ::=                       SEQUENCE {
    redirectedCarrierInfo                                   RedirectedCarrierInfo
    OPTIONAL,   -- Need N
    SelectOtherPLMN                                         SelectOtherPLMN
    cellReselectionPriorities                               CellReselectionPriorities
    OPTIONAL,   -- Need R
    suspendConfig                                           SuspendConfig
    OPTIONAL,   -- Need R
    deprioritisationReq                  SEQUENCE {
        deprioritisationType                 ENUMERATED {frequency, nr},
        deprioritisationTimer                ENUMERATED {min5, min10, min15,
    min30}
    }
    OPTIONAL,   -- Need N
    lateNonCriticalExtension                                OCTET    STRING
```

TABLE 9-continued

```
OPTIONAL,
    nonCriticalExtension                                                    SEQUENCE{ }
OPTIONAL
}
RedirectedCarrierInfo ::=           CHOICE {
    nr                                      CarrierInfoNR,
    eutra                                   RedirectedCarrierInfo-EUTRA,
    ...
}
RedirectedCarrierInfo-EUTRA ::=     SEQUENCE {
    eutraFrequency                          ARFCN-ValueEUTRA,
    cnType-r15                              ENUMERATED {epc,fiveGC}
OPTIONAL
}
CarrierInfoNR ::=                   SEQUENCE {
    carrierFreq                             ARFCN-ValueNR,
    ssbSubcarrierSpacing                    SubcarrierSpacing,
    smtc                                                        SSB-MTC
OPTIONAL,    -- Need S
    ...
}
SuspendConfig :=                    SEQUENCE {
    fullI-RNTI                              I-RNTI-Value,
    shortI-RNTI                             ShortI-RNTI-Value,
    ran-PagingCycle                         PagingCycle,
    ran-Notification AreaInfo                       RAN-NotificationAreaInfo
OPTIONAL,    -- Need M
    t380                                            PeriodicRNAU-TimerValue
OPTIONAL,    -- Need R
    nextHopChainingCount                    NextHopChainingCount,
    ...
}
PeriodicRNAU-TimerValue ::=         ENUMERATED { min5, min10, min20, min30,
min60, min120, min360, min720}
CellReselectionPriorities ::=       SEQUENCE {
    freqPriorityListEUTRA                               FreqPriorityListEUTRA
OPTIONAL,        -- Need M
    freqPriority ListNR                                 FreqPriority ListNR
OPTIONAL,        -- Need M
    t320                                    ENUMERATED {min5, min10, min20,
min30, min60, min120, min180, spare1}   OPTIONAL,     -- Need R
    ...
}
PagingCycle ::=                     ENUMERATED {rf32, rf64, rf128, rf256}
FreqPriority ListEUTRA :=                   SEQUENCE (SIZE (1..maxFreq)) OF
FreqPriorityEUTRA
FreqPriorityListNR ::=                      SEQUENCE (SIZE (1..maxFreq)) OF
FreqPriorityNR
FreqPriorityEUTRA :=                SEQUENCE {
    carrierFreq                             ARFCN-ValueEUTRA,
    cellReselectionPriority                 CellReselectionPriority,
    cellReselectionSubPriority                      CellReselectionSubPriority
OPTIONAL        -- Need R
}
FreqPriority NR ::=                 SEQUENCE {
    carrierFreq                             ARFCN-ValueNR,
    cellReselectionPriority                 CellReselectionPriority,
    cellReselectionSubPriority                      CellReselectionSubPriority
OPTIONAL        -- Need R
}
RAN-NotificationAreaInfo ::=        CHOICE {
    cellList                                PLMN-RAN-AreaCellList,
    ran-AreaConfigList                      PLMN-RAN-AreaConfigList,
    ...
}
PLMN-RAN-AreaCellList ::=                   SEQUENCE (SIZE (1..maxPLMNIdentities))
OF PLMN-RAN-AreaCell
PLMN-RAN-AreaCell ::=               SEQUENCE {
    plmn-Identity                                           PLMN-Identity
OPTIONAL,    -- Need S
    ran-AreaCells                           SEQUENCE (SIZE (1..32)) OF
CellIdentity
}
```

TABLE 9-continued

| | |
|---|---|
| PLMN-RAN-AreaConfigList := | SEQUENCE (SIZE (1..maxPLMNIdentities)) |
| OF PLMN-RAN-AreaConfig | |
| PLMN-RAN-AreaConfig := | SEQUENCE { |
| plmn-Identity | PLMN-Identity |
| OPTIONAL, -- Need S | |
| ran-Area | SEQUENCE (SIZE (1..16)) OF RAN- |
| AreaConfig | |
| } | |
| RAN-AreaConfig := | SEQUENCE { |
| trackingAreaCode | TrackingAreaCode, |
| ran-AreaCodeList | SEQUENCE (SIZE (1..32)) OF RAN-AreaCode |
| OPTIONAL -- Need R | |
| } | |
| -- TAG-RRCRELEASE-STOP | |
| -- ASN1STOP | |

Here, FFS Whether RejectWaitTimer is included in the RRCRelease message.

Table 10 is an example of RRCRelease field descriptions.

TABLE 10

RRCRelease field descriptions cnType
Indicate that the UE is redirected to EPC or 5GC.
deprioritisationReq
Indicates whether the current frequency or RAT is to be de-prioritised. The UE shall be able
to store a deprioritisation request for up to X frequencies (applicable when receiving
another frequency specific deprioritisation request before T325 expiry).
deprioritisationTimer
Indicates the period for which either the current carrier frequency or NR is deprioritised.
Value minN corresponds to N minutes.
suspendConfig
Indicates configuration for the RRC_INACTIVE state.
t380
Refers to the timer that triggers the periodic RNAU procedure in UE. Value min5
corresponds to 5 minutes, value min10 corresponds to 10 minutes and so on.
ran-PagingCycle
Refers to the UE specific cycle for RAN-initiated paging. Value rf32 corresponds to 32
radio frames, rf64 corresponds to 64 radio frames and so on.
redirectedCarrierInfo
Indicates a carrier frequency (downlink for FDD) and is used to redirect the UE to an NR or
an inter-RAT carrier frequency, by means of the cell selection upon leaving
RRC_CONNECTED (see TS 38.304 [20])
selectotherPLMN
Indicates whether the UE should select other PLMN. This information can further include
PLMN ID of candidate PLMN.

That is, the UE receiving the message as specified above performs newly a PLMN selection procedure, and selects another PLMN except a current PLMN in this procedure to perform the registration.

Method 3

In the above procedure, a UE, that is indicated to select other network not a current network (PLMN) from a cell (base station) on which the UE currently camps or is connected, performs the PLMN selection procedure, and a network (first PLMN) that the UE currently accesses in this procedure is excluded from candidates. For example, the UE includes a network, that transmits information to select the network that the UE currently accesses or other network, in a forbidden PLMN list.

Method 4

In general, in an area where a service provider, to which any UE subscribes services, is located, a network of the service provider is in competition with a network of other service provider. That is, when there are MNO A and MNO B in any area, if any UE has subscribed to the MNO A, the MNO B will not allow the access of the UE since the UE belongs to a network of the MNO A that is a competitor. This is a different situation from international roaming. This is because the MNO A does not own a network abroad, and thus overseas MNO is a cooperative partner for the MNO A.

Accordingly, when the UE needs to move to a network of other competitors due to a problem in a network of a provider to which the UE subscribes as above, the base station shall inform the UE so that the network of other competitors does not reject a registration of the UE. That is, a method is necessary to reject an access in a general situation not a disaster situation and to allow a registration in the event of an access of the disaster situation.

Accordingly, the present disclosure proposes that a UE informs a registration due to its disaster situation when the UE accesses a wireless network or a core network, in order to achieve the objects described above.

FIG. 14 is a flow chart illustrating a PLMN selection procedure according to method 4.

As illustrated in FIG. 14, a UE may select a core network 2 (second PLMN) based on an indication of the first base station in FIGS. 12 and 13, in S1401.

Next, the UE may send a RRC connection request to the selected core network 2 (second PLMN), in S1403. In this process, the UE may inform attempting to access the second PLMN based on a problem such as a home network of the UE or an indication in a previous network. That is, the UE may include, in an access request message, the fact that a cause of the access request is disaster roaming, while sending the access request message to the second PLMN.

Next, the UE may perform a registration to the core network 2 based on the RRC connection established in step S1403, in S1405.

For example, the RRC message and the NAS message may be exemplified as follows.

RRCSetupRequest

The RRCSetupRequest message is used to request the establishment of an RRC connection.

Signalling radio bearer: SRB0
RLC-SAP: TM
Logical channel: CCCH
Direction: UE to Network Table 11 is an example of the RRCSetupRequest message.

TABLE 11

```
RRCSetupRequest message
-- ASN1START
-- TAG-RRCSETUPREQUEST-START
RRCSetupRequest ::=          SEQUENCE {
    rrcSetupRequest              RRCSetupRequest-IEs
}
RRCSetupRequest-IEs :=       SEQUENCE {
    ue-Identity                  InitialUE-Identity,
    establishmentCause           EstablishmentCause,
    spare                        BIT STRING (SIZE (1))
}
InitialUE-Identity ::=       CHOICE {
    ng-5G-S-TMSI-Part1           BIT STRING (SIZE (39)),
    random Value                 BIT STRING (SIZE (39))
}
EstablishmentCause ::=       ENUMERATED {
                                 emergency, highPriorityAccess, mt-
Access, mo-Signalling,
                                 mo-Data, mo-VoiceCall, mo-VideoCall,
mo-SMS, mps-Priority Access, mcs-Priority Access,
                                 emergency roaming, spare5, spare4,
spare3, spare2, spare1}
-- TAG-RRCSETUPREQUEST-STOP
-- ASN1STOP
```

Table 12 is a description of RRCSetupRequest-IE field.

TABLE 12

| RRCSetupRequest-IEs field descriptions |
| --- |
| establishmentCause |
| Provides the establishment cause for the RRC request in accordance with the information received from upper layers. gNB is not expected to reject a RRCSetupRequest due to unknown cause value being used by the UE. In case when a UE is trying to establish RRC connection due to emergency roaming, this can be indicated using this establishment cause. |
| ue-Identity |
| UE identity included to facilitate contention resolution by lower layers. |

Table 13 is a description of InitialUE-Identity field.

TABLE 13

| InitialUE-Identity field descriptions |
| --- |
| ng-5G-S-TMSI-Part1 |
| The rightmost 39 bits of 5G-S-TMSI. |

TABLE 13-continued

| InitialUE-Identity field descriptions |
| --- |
| random Value |
| Integer value in the range 0 to $2^{39} - 1$. |

That is, if any UE accesses other network due to a problem of HPLMN, the UE may set a cause value to disaster roaming and attempt a connection.

A disaster roaming cause is merely an example, and may be set to other value of a name or purpose similar to this. For example, in the case of international roaming, if the UE attempts to access PLMN of MCC such as MCC of PLMN (network), to which the UE subscribes, using IMSI of the UE, the following cause field may be used.

Registration Request Procedure

Message Definition

The REGISTRATION REQUEST message is sent by the UE to the AMF. See Table 8.2.6.1.1 of the standard document.

Message type: REGISTRATION REQUEST
Significance: dual
Direction: UE to network

Table 13 is Table 8.2.6.1.1 of the standard document, and illustrates components of the REGISTRATION REQUEST message.

TABLE 14

| IEI | Information Element | Type/Reference | Presence | Format | Length |
|---|---|---|---|---|---|
| | Extended protocol discriminator | Extended protocol discriminator 9.2 | M | V | 1 |
| | Security header type | Security header type 9.3 | M | V | ½ |
| | Spare half octet | Spare half octet 9.5 | M | V | ½ |
| | Registration request message identity | Message type 9.7 | M | V | 1 |
| | 5GS registration type | 5GS registration type 9.11.3.7 | M | LV | 2 |
| | ngKSI | NAS key set identifier 9.11.3.32 | M | V | ½ |
| | Spare half octet | Spare half octet 9.5 | M | V | ½ |
| | 5GS mobile identity | 5GS mobile identity 9.11.3.4 | M | LV | 5-TBD |
| C- | Non-current native NAS key set identifier | NAS key set identifier 9.11.3.32 | O | TV | 1 |
| 10 | 5GMM capability | 5GMM capability 9.11.3.1 | O | TLV | 3-15 |
| 2E | UE security capability | UE security capability 9.11.3.54 | O | TLV | 4-10 |
| 2F | Requested NSSAI | NSSAI 9.11.3.37 | O | TLV | 4-74 |
| 52 | Last visited registered TAI | 5GS tracking area identity 9.11.3.8 | O | TV | 7 |
| 65 | S1 UE network capability | S1 UE network capability 9.11.3.48 | O | TLV | 4-15 |
| 40 | Uplink data status | Uplink data status 9.11.3.57 | O | TLV | 4-34 |
| 50 | PDU session status | PDU session status 9.11.3.44 | O | TLV | 4-34 |
| B- | MICO indication | MICO indication 9.11.3.31 | O | TV | 1 |
| 2B | UE status | UE status 9.11.3.56 | O | TLV | 3 |
| 2C | Additional GUTI | 5GS mobile identity 9.11.3.4 | O | TLV | TBD |
| 25 | Allowed PDU session status | Allowed PDU session status 9.11.3.13 | O | TLV | 4-34 |
| 60 | UE's usage setting | UE's usage setting 9.11.3.55 | O | TLV | 3 |
| TBD | Requested DRX parameters | DRX parameters 9.11.3.22 | O | TBD | TBD |
| 7C | EPS NAS message container | EPS NAS message container 9.11.3.24 | O | TLV-E | TBD |
| 7E | LADN indication | LADN indication 9.11.3.29 | O | TLV-E | 3-811 |
| 7B | Payload container | Payload container 9.11.3.39 | O | TLV-E | 4-65538 |

The content of the REGISTRATION REQUEST message when a limited set of IEs including those needed to establish security in the initial message when it has no NAS security context is FFS.

5GS Registration Type

The purpose of the 5GS registration type information element is to indicate the type of the requested registration. The 5GS registration type information element is coded as shown in Tables 15 and 16. The 5GS registration type is a type 4 information element with a length of 3 octets.

TABLE 15

| 8 | 7 | 6 | 5 | 4 | 3 | 2 | 1 | |
|---|---|---|---|---|---|---|---|---|
| | | 5GS registration type IEI | | | | | | octet 1 |
| | | Length of 5GS registration type contents | | | | | | octet 2 |
| 0 Spare | 0 Spare | NG-RAN-RCU | FOR | SMS requested | 5GS registration type value | | | octet 3 |

TABLE 16

5GS registration type value (octet 3, bits 1 to 3)

| Bits | | | |
|---|---|---|---|
| 3 | 2 | 1 | |
| 0 | 0 | 1 | initial registration |
| 0 | 1 | 0 | mobility registration updating |
| 0 | 1 | 1 | periodic registration updating |
| 1 | 0 | 0 | disaster registration |

TABLE 16-continued

| 1 | 0 | 1 | disaster roaming |
| 1 | 1 | 1 | reserved |

All other values are unused and shall be interpreted as "initial registration", if received by the network.

SMS over NAS transport requested (SMS requested) (octet 3, bit 4)

Bit 4

| 0 | SMS over NAS not supported |
| 1 | SMS over NAS supported |

Follow-on request bit (FOR) (octet 3, bit 5)

Bit 5

| 0 | No follow-on request pending |
| 1 | Follow-on request pending |

NG-RAN Radio Capability Update (NG-RAN-RCU) (octet 3, bit 6)

Bit 6

| 0 | NG-RAN radio capability update not needed |
| 1 | NG-RAN radio capability update needed |

Bits 7 to 8 of octet 3 are spare and shall be coded as zero.
Bits 7 to 8 of octet 3 are spare and shall be coded as zero.

Similarly, even when the UE performs registration to the network using an NAS message, the UE may inform emergency roaming via registration type information of the UE.

Preferably, in the above procedure, it may be based on PLMN codes that the UE includes information as above. That is, when the UE accesses a PLMN with the same MCC among UE's PLMN codes, the UE notifies performing a registration for an emergency reason as above, and does not notify otherwise.

The present disclosure has been described based on HPLMN, but can be applied to cases other than HPLMN.

Method 3

When a problem occurs in any communication network in any country in the above procedure, the relevant agencies in each country define a case where communication services cannot be provided to UEs due to the problem of the communication network as a disaster, and will try to promptly inform the general public of it. Thus, a server managing the contents of a public warning system (PWS) composes a disaster text message and transmits it to each communication network, and the communication networks receiving it will transmit the PWS to the UEs over their own networks.

However, in the above operation, if a UE of the network (network A) in which the problem occurs is powered off or if the UE is not in the coverage range of any network, the UE cannot receive the disaster text message transmitted by each network.

In particular, in order to prevent it, if each network indefinitely repeats transmission of the PWS, this becomes inefficient and is a factor of unnecessary waste of radio resources.

Method 3-1

Accordingly, the present disclosure is to propose a method for efficiently receiving, by all UEs, a disaster text message.

To this end, in the present disclosure, when any UE newly performs registration to other network or performs registration to a network in other area of the same network, each UE may transmit information for the last PWS received by the UE or information about whether the UE has received the PWS. Based on this, if the network determines that the UE has not received the PWS that the UE shall receive, the network may send it to the UE.

Method 3-1-1

For example, when the UE performs a registration process to a network over a new network (network B) or a new TA, the UE may transmit information for the last received PWS or identity information, and this information may be a message ID. Unlike this, if there is no corresponding information, the UE may inform the network that there is no corresponding information. Based on this, the network may compare it with a message ID that the network has transmitted most recently, and determine whether the UE has properly received the latest PWS.

For example, when the UE performs a registration process to a network over a new network (network B) or a new TA, the UE may transmit information related to a time at which the UE has received the last PWS, or area information. Based on this, the network may check a time at which the network has transmitted the PWS most recently, and determine whether the UE has properly received the latest PWS.

Method 3-1-2

Based on the description in the method 3-1-1, if the network determines that the UE has not received latest information, the network may send a PWS message the network has stored, or inform a PWS transmission agency that there is a UE that has not yet received the PWS. Hence, the network may allow the PWS transmission agency to perform retransmission.

Method 3-1-2-1

In the method 3-1-2, the network may store the previous PWS in order to directly transmit the PWS to the UE. Alternatively, if the PWS transmission agency delegates it to the network, the PWS transmission agency informs information, such as an identity of a related message, e.g., a message ID, together with the PWS message.

Method 3-1-2-2

In the method 3-1-2, if the network informs a PWS transmission agency that there is a UE that has not yet received the PWS, the PWS transmission agency may determine not to retransmit the PWS to all the areas and to send a specific message only to the UE. In this case, the PWS may send a content of the PWS message to the network, and may indicate that the network transmits it to only the UE.

The network receiving it sends the message to the UE using a text message, or sends the message to the UE using an NAS message.

Method 3-1-3

In order to support the description of the method 3-1, if each UE receives a PWS message, the UE may store a message ID of each PWS message and a reception time of the PWS message in a memory, or manage them in the NAS message.

Method 3-1-4

In the operation of the method 3-1, only if the network indicates, via SIB, etc. or via the NAS message, that the UE transmits the above information, the UE transmits information related to the PWS reception.

Method 3-1-5

The operation of the method 3-1 may also be automatically attempted when a network to which the UE has registered lastly is different from a network to which the UE is going to register currently. Alternatively, in a disaster roaming situation, when the UE accesses a new network, it may be delivered.

Method 3-1-6

The operation of the method 3-1 may also be performed when time at which the UE cannot access any network or time at which the UE cannot find any network is equal to or greater than a predetermined time.

Main Embodiments of the Present Disclosure

FIG. 15 is a flow chart illustrating a method for a UE to perform a registration to a network in accordance with an embodiment of the present disclosure.

As illustrated in FIG. 15, first, a UE may perform registration to a first PLMN via a first base station, in S1501.

Next, when the UE can no longer receive services from the first PLMN (e.g., disaster generation), the UE may receive, from the first base station, a message related to a disaster applied to the first PLMN or applied to an area in which the UE is located, in S1503.

Next, the UE may perform registration to a second PLMN providing an disaster roaming service based on an disaster related message, in 51505.

FIG. 16 is a flow chart illustrating a method for a base station to register a UE to a network in accordance with an embodiment of the present disclosure.

As illustrated in FIG. 16, first, a base station may perform UE's registration to a first PLMN, in S1601.

Next, when the UE can no longer receive services from the first PLMN, the base station may send the UE a message related to a disaster applied to the first PLMN or applied to an area in which the UE is located, in S1603.

Overview of Device to which the Present Disclosure is Applicable

FIG. 17 illustrates a block diagram of configuration of a communication device according to an embodiment of the present disclosure.

Referring to FIG. 17, a wireless communication system includes a network node 1710 and a plurality of UEs 1720.

The network node 1710 includes a processor 1711, a memory 1712, and a communication module (or transceiver) 1713. The processor 1711 may implement functions, processes, and/or methods described above with reference to FIGS. 1 to 14. Layers of wired/wireless interface protocol may be implemented by the processor 1711.

The memory 1712 is connected to the processor 1711 and stores various types of information for driving the processor 1711. The communication module 1713 is connected to the processor 1711 and transmits and/or receives wired/wireless signals. Examples of the network node 1710 may include a base station, AMF, SMF, UDF, or the like. In particular, if the network node 1710 is the base station, the communication module 1713 may include a radio frequency (RF) unit for transmitting/receiving a radio signal.

The UE 1720 includes a processor 1721, a memory 1722, and a communication module (or RF unit) (or transceiver) 1723. The processor 1721 may implement functions, processes and/or methods described above with reference to FIGS. 1 to 14. Layers of a radio interface protocol may be implemented by the processor 1721. In particular, the processor 1721 may include the NAS layer and the AS layer. The memory 1722 is connected to the processor 1721 and stores various types of information for driving the processor 1721. The communication module 1723 is connected to the processor 1721 and transmits and/or receives a radio signal.

The memories 1712 and 1722 may be inside or outside the processors 1711 and 1721 and may be connected to the processors 1711 and 1721 through various well-known means. Further, the network node 1710 (in case of the base station) and/or the UE 1720 may have a single antenna or multiple antennas.

FIG. 18 illustrates a block diagram of configuration of a communication device according to an embodiment of the present disclosure.

In particular, FIG. 18 illustrates in more detail the UE illustrated in FIG. 17. The communication module illustrated in FIG. 17 includes an RF module (or RF unit) illustrated in FIG. 18. The processor illustrated in FIG. 17 corresponds to a processor (or a digital signal processor (DSP) 1810) in FIG. 18. The memory illustrated in FIG. 17 corresponds to a memory 1830 illustrated in FIG. 18.

Referring to FIG. 18, the UE may include a processor (or digital signal processor (DSP)) 1810, an RF module (or RF unit) 1835, a power management module 1805, an antenna 1840, a battery 1855, a display 1815, a keypad 1820, a memory 1830, a subscriber identification module (SIM) card 1825 (which is optional), a speaker 1845, and a microphone 1850. The UE may also include a single antenna or multiple antennas.

The processor 1810 implements functions, processes, and/or methods described above. Layers of a radio interface protocol may be implemented by the processor 1810.

The memory 1830 is connected to the processor 1810 and stores information related to operations of the processor 1810. The memory 1830 may be inside or outside the processor 1810 and may be connected to the processors 1810 through various well-known means.

A user inputs instructional information, such as a telephone number, for example, by pushing (or touching) buttons of the keypad 1820 or by voice activation using the microphone 1850. The processor 1810 receives and processes the instructional information to perform an appropriate function, such as to dial the telephone number. Operational data may be extracted from the SIM card 1825 or the memory 1830. Further, the processor 1810 may display instructional information or operational information on the display 1815 for the user's reference and convenience.

The RF module 1835 is connected to the processor 1810 and transmits and/or receives an RF signal. The processor 1810 forwards instructional information to the RF module 1835 in order to initiate communication, for example, transmit a radio signal configuring voice communication data. The RF module 1835 includes a receiver and a transmitter to receive and transmit the radio signal. The antenna 1840 functions to transmit and receive the radio signal. Upon reception of the radio signal, the RF module 1835 may send a signal to be processed by the processor 1810 and convert the signal into a baseband. The processed signal may be converted into audible or readable information output via the speaker 1845.

FIG. 19 illustrates an example of a structure of a radio interface protocol in a control plane between a UE and eNodeB.

The radio interface protocol is based on 3GPP radio access network standard. The radio interface protocol horizontally consists of a physical layer, a data link layer, and a network layer, and is vertically divided into a user plane for data information transmission and a control plane for control signaling delivery.

The protocol layers may be divided into L1 (first layer), L2 (second layer), and L3 (third layer) based on three lower layers of an open system interconnection (OSI) standard model that is well known in the art of communication systems.

The layers of the radio protocol in the control plane illustrated in FIG. 19 are described below.

The physical layer, the first layer, provides an information transfer service using a physical channel. The physical layer is connected to a medium access control (MAC) layer located at a higher level via a transport channel, and data between the MAC layer and the physical layer is transferred via the transport channel. Data is transferred between different physical layers, i.e., between physical layers of a transmission side and a reception side via the physical channel.

The physical channel consists of several subframes on a time axis and several subcarriers on a frequency axis. One subframe consists of a plurality of symbols and a plurality of subcarriers on the time axis. One subframe consists of a plurality of resource blocks, and one resource block consists of a plurality of symbols and a plurality of subcarriers. A unit time, a transmission time interval (TTI), at which data is transmitted, is 1 ms corresponding to one subframe.

Physical channels existing in the physical layers of the transmission side and the reception side may be divided into, according to 3GPP LTE, a physical downlink shared channel (PDSCH) and a physical uplink shared channel (PUSCH) that are data channels, and a physical downlink control channel (PDCCH), a physical control format indicator channel (PCFICH), a physical hybrid-ARQ indicator channel (PHICH), and a physical uplink control channel (PUCCH) that are control channels.

The PCFICH transmitted on a first OFDM symbol of a subframe carries a control format indicator (CFI) regarding the number of OFDM symbols used for transmission of control channels in the subframe (i.e., size of a control region). A wireless device first receives the CFI on the PCFICH and then monitors the PDCCH.

Unlike the PDCCH, the PCFICH is transmitted via a fixed PCFICH resource of the subframe without the use of blind decoding.

The PHICH carries positive acknowledgement (ACK)/negative acknowledgement (NACK) signal for uplink (UL) hybrid automatic repeat request (HARQ). The ACK/NACK signal for UL data on PUSCH transmitted by the wireless device is transmitted on the PHICH.

A physical broadcast channel (PBCH) is transmitted on first four OFDM symbols of a second slot of a first subframe of a radio frame. The PBCH carries system information essential for the wireless device to communicate with the base station, and system information transmitted on the PBCH is referred to as a master information block (MIB). Compared to this, system information transmitted on the PDSCH indicated by the PDCCH is referred to as a system information block (SIB).

The PDCCH may carry resource allocation and transport format of a downlink shared channel (DL-SCH), resource allocation information of an uplink shared channel (UL-SCH), paging information on a paging channel (PCH), system information on DL-SCH, resource allocation of an upper layer control message such as a random access response transmitted on PDSCH, a set of Tx power control commands on individual UEs within an arbitrary UE group, a Tx power control command, activation of a voice over internet protocol (VoIP), etc. A plurality of PDCCHs can be transmitted within a control region, and the UE can monitor the plurality of PDCCHs. The PDCCH is transmitted on aggregation of one or multiple consecutive control channel elements (CCEs). The CCE is a logical allocation unit used to provide the PDCCH with a coding rate based on a state of a radio channel. The CCE corresponds to a plurality of resource element groups. A format of the PDCCH and the number of bits of the available PDCCH are determined depending on a correlation between the number of CCEs and the coding rate provided by the CCEs.

Control information transmitted on PDCCH is referred to as downlink control information (DCI). The DCI may contain resource allocation of PDSCH (which is also referred to as DL grant), resource allocation of PUSCH (which is also referred to as UL grant), a set of Tx power control commands on individual UEs within an arbitrary UE group, and/or activation of a voice over internet protocol (VoIP).

There are several layers in the second layer. First, a medium access control (MAC) layer functions to map various logical channels to various transfer channels, and also performs a function of logical channel multiplexing for mapping several logical channels to one transfer channel. The MAC layer is connected to a radio link control (RLC) layer, that is an upper layer, via the logical channel. The logical channel is roughly divided into a control channel used to transmit information of the control plane and a traffic channel used to transmit information of the user plane, according to a type of transmitted information.

The radio link control (RLC) layer of the second layer segments and concatenate data received from the upper layer and adjusts a data size so that a lower layer is adapted to transmit data to a radio section. In order to guarantee various QoS required by each radio bearer (RB), the RLC layer provides three operation modes of a transparent mode (TM), an unacknowledged mode (UM) (non-response mode), and an acknowledged mode (AM) (or response mode). In particular, the AM RLC performs a retransmission function through an automatic repeat and request (ARQ) function for reliable data transmission.

A packet data convergence protocol (PDCP) layer of the second layer performs a header compression function of reducing an IP packet header size that has a relatively large size and contains unnecessary control information, in order to efficiently transmit data in a radio section having a small bandwidth upon transmission of IP packet such as IPv4 or IPv6. This allows only information, that is necessarily required in a header part of data, to be transmitted, thereby increasing transmission efficiency of the radio section. In the LTE system, the PDCP layer also performs a security function, which consists of ciphering for preventing data interception by a third party and integrity protection for preventing data manipulation by a third party.

A radio resource control (RRC) layer located at the uppermost part of the third layer is defined only in the control plane and is responsible for controlling logical channels, transport channels, and physical channels in relation to configuration, re-configuration, and release of radio bearers (RBs). The RB means services provided by the second layer to ensure data transfer between the UE and the E-UTRAN.

If an RRC connection is established between an RRC layer of the UE and an RRC layer of a wireless network, the UE is in an RRC connected mode. Otherwise, the UE is in an RRC idle mode.

An RRC state of the UE and an RRC connection method are described below. The RRC state refers to a state in which the RRC of the UE is or is not logically connected with the RRC of the E-UTRAN. The RRC state of the UE having logical connection with the RRC of the E-UTRAN is referred to as an RRC_CONNECTED state, and the RRC state of the UE not having logical connection with the RRC of the E-UTRAN is referred to as an RRC_IDLE state. Since the UE in the RRC_CONNECTED state has the RRC connection, the E-UTRAN can identify the presence of the corresponding UE on a per cell basis and thus efficiently control the UE. On the other hand, the E-UTRAN cannot identify the presence of the UE of the RRC_IDLE state, and the UE in the RRC_IDLE state is managed by a core network based on a tracking area (TA) which is an area unit larger than the cell. That is, for the UE in the RRC_IDLE state, only presence or absence of the corresponding UE is identified in an area unit larger than the cell. In order for the UE of the RRC_IDLE state to receive typical mobile communication services such as voice and data, the UE should transition to the RRC_CONNECTED state. Each TA is distinguished from another TA by a tracking area identity (TAI) thereof. The UE may configure the TAI through a tracking area code (TAC) which is information broadcasted from a cell.

When the user initially turns on the UE, the UE first searches for a proper cell, and then establishes RRC connection in the corresponding cell and registers information of the UE in the core network. Thereafter, the UE stays in the RRC_IDLE state. The UE staying in the RRC_IDLE state (re)selects a cell and checks system information or paging information, if necessary. This operation is called camping on a cell. Only when the UE staying in the RRC_IDLE state needs to establish the RRC connection, the UE establishes the RRC connection with the RRC layer of the E-UTRAN through a RRC connection procedure and transitions to the RRC_CONNECTED state. There are several cases where the UE remaining in the RRC_IDLE state needs to establish the RRC connection. Examples of the cases may include a case where transmission of uplink data is necessary for a reason of an attempt of a user to make a phone call, etc., or transmission of a response message when receiving a paging signal from the E-UTRAN.

A non-access stratum (NAS) layer performs functions such as session management and mobility management.

The NAS layer illustrated in FIG. 19 is described in detail below.

The NAS layer is divided into a NAS entity for mobility management (MM) and a NAS entity for session management (SM).

1) The NAS entity for MM generally provides the following functions.

An NAS procedure related to the AMF includes the following.

Registration management and connection management procedure. The AMF supports the functions.

Secure NAS signal connection between the UE and the AMF (integrity protection, ciphering)

2) The NAS entity for SM performs session management between the UE and the SMF.

A SM signalling message is generated and processed in the UE and the NAS-SM layer of the SMF. The content of the SM signalling message is not interpreted by the AMF.

In case of SM signalling transmission,

The NAS entity for MM generates security header indicating NAS transmission of SM signalling, and a NAS-MM message deriving a method and location of sending the SM signalling message via additional information for the received NAS-MM.

Upon reception of SM signalling, the NAS entity for SM performs integrity check of the NAS-MM message, and derives a method and place of deriving the SM signalling message by interpreting additional information.

In FIG. 19, the RRC layer, the RLC layer, the MAC layer, and the PHY layer located below the NAS layer are collectively referred to access stratum (AS) layer.

Application Range of the Present Disclosure

A wireless device in the present disclosure may be a base station, a network node, a transmitter UE, a receiver UE, a radio device, a wireless communication device, a vehicle, a vehicle with a self-driving function, a drone (unmanned aerial vehicle (UAV)), an artificial intelligence (AI) module, a robot, an augmented reality (AR) device, a virtual reality (VR) device, an MTC device, an IoT device, a medical device, a FinTech device (or financial device), a security device, a climate/environment device, or a device related to the fourth industrial revolution field or 5G service, or the like. For example, the drone may be an airborne vehicle that flies by a radio control signal without a person being on the flight vehicle. For example, the MTC device and the IoT device may be a device that does not require a person's direct intervention or manipulation, and may include a smart meter, a vending machine, a thermometer, a smart bulb, a door lock, a variety of sensors, or the like. For example, the medical device may be a device used for the purpose of diagnosing, treating, reducing, handling or preventing a disease and a device used for the purpose of testing, substituting or modifying a structure or function, and may include a device for medical treatment, a device for operation, a device for (external) diagnosis, a hearing aid, or a device for a surgical procedure, or the like. For example, the security device may be a device installed to prevent a possible danger and to maintain safety, and may include a camera, CCTV, a black box, or the like. For example, the FinTech device may be a device capable of providing financial services, such as mobile payment, and may include a payment device, point of sales (POS), or the like. For example, the climate/environment device may refer to a device for monitoring and predicting the climate/environment.

Mobile terminals disclosed in the present disclosure may include cellular phones, smart phones, laptop computers, digital broadcast terminals, personal digital assistants (PDAs), portable multimedia players (PMPs), navigators, slate PCs, tablet PCs, ultra-books, wearable devices (e.g., smart watches, smart glasses, head mounted displays (HMDs)), and the like. Furthermore, the mobile terminals may be used for controlling at least one device in an Internet of Things (IoT) environment or a smart greenhouse.

By way of non-limiting example only, further description will be made with reference to particular types of mobile terminals. However, such teachings may be equally applied to other types of mobile terminals, such as those types noted above. In addition, it can be readily apparent to those skilled in the art that these teachings can also be applied to stationary terminals such as digital TV, desktop computers, digital signage, and the like.

Hereinafter, embodiments related to a control method which can be implemented by the mobile terminal configured as above were described with reference to the accompanying drawings. It is apparent to those skilled in the art that various modifications can be made to within the range without departing from the spirit and essential features of the present invention.

The embodiments of the present disclosure described above can be implemented by various means. For example, embodiments of the present disclosure can be implemented by hardware, firmware, software, or combinations thereof.

When embodiments are implemented by hardware, a method according to embodiments of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, a method according to embodiments of the present disclosure can be implemented by devices, procedures, functions, etc. performing functions or operations described above. Software code can be stored in a memory unit and can be executed by a processor. The memory unit is provided inside or outside the processor and can exchange data with the processor by various well-known means.

The present disclosure described above can be implemented using a computer-readable medium with programs recorded thereon for execution by a processor to perform various methods presented herein. The computer-readable medium includes all kinds of recording devices capable of storing data that is readable by a computer system. Examples of the computer-readable mediums include hard disk drive (HDD), solid state disk (SSD), silicon disk drive (SDD), ROM, RAM, CD-ROM, a magnetic tape, a floppy disk, and an optical data storage device, other types of storage mediums presented herein, etc. If desired, the computer-readable medium may be implemented in the form of a carrier wave (e.g., transmission over Internet). The computer may include the processor of the terminal. Accordingly, the detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

INDUSTRIAL APPLICABILITY

The communication method described above can be applied to various wireless communication systems including IEEE 802.16x and 802.11x systems, in addition to the 3GPP system. Furthermore, the proposed method can be applied to the mmWave communication system using ultra-high frequency bands.

The invention claimed is:

1. A method performed, by a user equipment (UE) in a wireless communication system, the method comprising:
selecting a public land mobile network (PLMN);
transmitting, to the PLMN, a registration request message; and
receiving, from the PLMN, a registration accept message,
wherein the registration request message includes information for a registration type,
wherein the information for the registration type represents one among a plurality of 3-bit values related to a type of a requested registration, and
wherein, based on the information for the registration type representing a 3-bit value which is configured for a disaster roaming, the UE is provided with a disaster roaming service from the PLMN based on a disaster condition applied to a home PLMN (HPLMN) of the UE.

2. The method of claim 1, wherein the disaster condition is related to an area in which the UE is located.

3. A user equipment (UE) configured to operate in a wireless communication system, the UE comprising:
an RF module configured to transmit and receive a radio signal;
at least one processor functionally connected to the RF module; and
at least one computer memory operationally connected to the at least one processor,
wherein the at least one computer memory stores instructions that, based on being executed by the at least one processor, perform operations comprising:
selecting a public land mobile network (PLMN);
transmitting, to the PLMN, a registration request message; and
receiving, from the PLMN, a registration accept message,
wherein the registration request message includes information for a registration type,
wherein the information for the registration type represents one among a plurality of 3-bit values related to a type of a requested registration, and
wherein, based on the information for the registration type representing a 3-bit value which is configured for a disaster roaming, the UE is provided with a disaster roaming service from the PLMN based on a disaster condition applied to a home PLMN (HPLMN) of the UE.

4. The UE of claim 3, wherein the disaster condition is related to an area in which the UE is located.

5. At least one non-transitory computer-readable media storing instructions that, based on being executed by at least one processor, perform operations comprising:
selecting a first public land mobile network (PLMN);
transmitting, to the PLMN, a registration request message; and
receiving, from the PLMN, a registration accept message,
wherein the registration request message includes information for a registration type,
wherein the information for the registration type represents one among a plurality of 3-bit values related to a type of a requested registration, and
wherein, based on the information for the registration type representing a 3-bit value which is configured for a disaster roaming, a user equipment (UE) is provided with a disaster roaming service from the PLMN based on a disaster condition applied to a home PLMN (HPLMN) of the UE.

* * * * *